United States Patent
Tobiason et al.

(10) Patent No.: US 12,174,005 B2
(45) Date of Patent: Dec. 24, 2024

(54) METROLOGY SYSTEM WITH POSITION AND ORIENTATION TRACKING UTILIZING LIGHT BEAMS

(71) Applicant: Mitutoyo Corporation, Kanagawa-ken (JP)

(72) Inventors: Joseph Daniel Tobiason, Bothell, WA (US); Michael Nahum, Seattle, WA (US); Norman Laman, Kenmore, WA (US); Ted Staton Cook, Kirkland, WA (US)

(73) Assignee: Mitutoyo Corporation, Kanagawa-ken (JP)

( * ) Notice: Subject to any disclaimer, the term of this patent is extended or adjusted under 35 U.S.C. 154(b) by 434 days.

(21) Appl. No.: 17/562,704

(22) Filed: Dec. 27, 2021

(65) Prior Publication Data
US 2023/0204340 A1 Jun. 29, 2023

(51) Int. Cl.
*G01B 11/00* (2006.01)
*G01B 11/14* (2006.01)

(52) U.S. Cl.
CPC ............ *G01B 11/005* (2013.01); *G01B 11/14* (2013.01)

(58) Field of Classification Search
CPC ...... G01B 11/005; G01B 11/14; G01B 21/04; G01B 11/002; G01B 11/00
See application file for complete search history.

(56) References Cited

U.S. PATENT DOCUMENTS

| | | | |
|---|---|---|---|
| 4,613,943 A | 9/1986 | Miyake et al. | |
| 4,725,965 A | * 2/1988 | Keenan | B25J 9/1653 700/254 |
| 4,831,549 A | 5/1989 | Red et al. | |
| 5,086,401 A | 2/1992 | Glassman et al. | |
| 5,105,368 A | 4/1992 | Alexandersen et al. | |
| 5,297,238 A | 3/1994 | Wang et al. | |

(Continued)

FOREIGN PATENT DOCUMENTS

WO WO-2011036033 A1 * 3/2011 ........... G01B 11/002

OTHER PUBLICATIONS

Krajník et al., "External Localization System for Mobile Robotics," 16th International Conference on Advanced Robotics (ICAR), Nov. 25-29, 2013, Montevideo, Uruguay. (6 Pages).

(Continued)

*Primary Examiner* — Yaritza Guadalupe-McCall
(74) *Attorney, Agent, or Firm* — Seed IP Law Group LLP

(57) ABSTRACT

A metrology system is provided for use with a movement system that moves an end tool (e.g., a probe). The metrology system includes a sensor configuration, a light beam source configuration and a processing portion. The sensor configuration comprises a plurality of light beam sensors. The light beam source configuration directs light beams to the light beam sensors of the sensor configuration. One of the light beam source configuration or the sensor configuration is coupled to the end tool and/or an end tool mounting configuration of the movement system which moves the end tool. The light beams that are directed to the light beam sensors cause the light beam sensors to produce corresponding measurement signals. A processing portion processes the measurement signals from the light beam sensors which indicate the position and orientation of the end tool.

23 Claims, 10 Drawing Sheets

(56) References Cited

U.S. PATENT DOCUMENTS

| | | |
|---|---|---|
| 5,617,335 A | 4/1997 | Hashima et al. |
| 5,798,947 A | 8/1998 | Ye et al. |
| 5,876,325 A | 3/1999 | Mizuno et al. |
| 6,222,940 B1 | 4/2001 | Wenzel et al. |
| 6,640,008 B1 | 10/2003 | Lee et al. |
| 6,681,151 B1 | 1/2004 | Weinzimmer et al. |
| 6,781,694 B2 | 8/2004 | Nahum et al. |
| 6,937,349 B2 | 8/2005 | Jones et al. |
| 7,105,753 B1 | 9/2006 | Lapstun et al. |
| 7,532,949 B2 | 5/2009 | Ban et al. |
| 7,845,560 B2 | 12/2010 | Emanuel et al. |
| 8,792,963 B2 | 7/2014 | Zhao et al. |
| 8,981,324 B2 | 3/2015 | Rigney et al. |
| 8,989,898 B2 | 3/2015 | DeVlieg |
| 9,050,728 B2 | 6/2015 | Ban et al. |
| 9,572,549 B2 | 2/2017 | Belevich et al. |
| 9,797,706 B2 | 10/2017 | Jordil et al. |
| 10,058,996 B2 | 8/2018 | Hosek et al. |
| 10,099,380 B2 | 10/2018 | Ishige et al. |
| 10,625,427 B2 | 4/2020 | Troy et al. |
| 10,751,883 B2 | 8/2020 | Nahum |
| 10,871,366 B2 * | 12/2020 | Nahum ................ B25J 19/023 |
| 10,913,156 B2 * | 2/2021 | Nahum ................ G05B 19/401 |
| 11,002,529 B2 * | 5/2021 | Nahum ................ B25J 13/089 |
| 11,725,929 B2 * | 8/2023 | Haverkamp ........... G01B 21/04 |
| | | 356/614 |
| 11,745,354 B2 * | 9/2023 | Atherton ................ B25J 9/1664 |
| | | 700/259 |
| 2003/0144765 A1 | 7/2003 | Habibi et al. |
| 2005/0225278 A1 | 10/2005 | Ban et al. |
| 2006/0017022 A1 | 1/2006 | Rigney et al. |
| 2007/0296366 A1 | 12/2007 | Quaid et al. |
| 2009/0180667 A1 | 7/2009 | Mahan et al. |
| 2009/0234502 A1 | 9/2009 | Ueyama et al. |
| 2010/0331855 A1 | 12/2010 | Zhao et al. |
| 2011/0029131 A1 | 2/2011 | Ban et al. |
| 2013/0035791 A1 | 2/2013 | Chiu et al. |
| 2013/0090554 A1 | 4/2013 | Zvuloni et al. |
| 2013/0123982 A1 | 5/2013 | Chiu et al. |
| 2013/0158947 A1 | 6/2013 | Suzuki |
| 2014/0157610 A1 | 6/2014 | Garvey et al. |
| 2014/0301632 A1 | 10/2014 | Ikeda et al. |
| 2014/0343727 A1 | 11/2014 | Calkins et al. |
| 2015/0158181 A1 | 6/2015 | Kawamura et al. |
| 2016/0008988 A1 | 1/2016 | Kennedy et al. |
| 2016/0039096 A1 | 2/2016 | Wallack et al. |
| 2016/0136812 A1 | 5/2016 | Hosek et al. |
| 2016/0151915 A1 | 6/2016 | Nishi et al. |
| 2016/0223316 A1 | 8/2016 | Jordil et al. |
| 2016/0291160 A1 | 10/2016 | Zweigle et al. |
| 2017/0140521 A1 | 5/2017 | Sakaguchi et al. |
| 2017/0148154 A1 | 5/2017 | Nakao |
| 2017/0151671 A1 | 6/2017 | Ishige et al. |
| 2017/0182665 A1 | 6/2017 | Okuyama et al. |
| 2018/0004188 A1 | 1/2018 | Yamaguchi et al. |
| 2018/0018778 A1 | 1/2018 | Haverkamp et al. |
| 2018/0153437 A1 | 6/2018 | Schwartz et al. |
| 2018/0272490 A1 | 9/2018 | Brenner et al. |
| 2018/0279993 A1 | 10/2018 | Crawford et al. |
| 2018/0361571 A1 | 12/2018 | Georgeson et al. |
| 2018/0361595 A1 | 12/2018 | Troy et al. |
| 2018/0373158 A1 | 12/2018 | Baier et al. |
| 2019/0005600 A1 | 1/2019 | Hazeyama |
| 2019/0015980 A1 | 1/2019 | Kojima et al. |
| 2019/0056218 A1 | 2/2019 | Ulmer et al. |
| 2019/0099887 A1 | 4/2019 | Huang et al. |
| 2019/0195607 A1 | 6/2019 | Nahum |
| 2019/0256300 A1 | 8/2019 | Shimamura et al. |
| 2019/0291277 A1 | 9/2019 | Oleynik |
| 2023/0099779 A1 * | 3/2023 | Redgewell ............ G01S 17/66 |
| | | 356/614 |
| 2023/0204340 A1 * | 6/2023 | Tobiason ............... G01B 21/04 |
| | | 33/503 |

OTHER PUBLICATIONS

Nguyen et al., "A New Full Pose Measurement Method for Robot Calibration," Sensors 13(7): 9132-9147, 2013.

Pérez et al., "Robot Guidance Using Machine Vision Techniques in Industrial Environments: A Comparative Review," Sensors 16(3):335, 2016. (26 pages).

SCARA, URL=https://en.wikipedia.org/w/index.php?title=SCARA&oldid=838861482, Archive Date Apr. 29, 2018. (2 pages).

Hamamatsu, "iPMSEL," Jun. 2006, URL=https://www.hamamatsu.com/us/en/our-company/business-domain/central-research-laboratory/optical-materials/ipmsel.html, retrieved on Aug. 22, 2023. (12 pages).

* cited by examiner

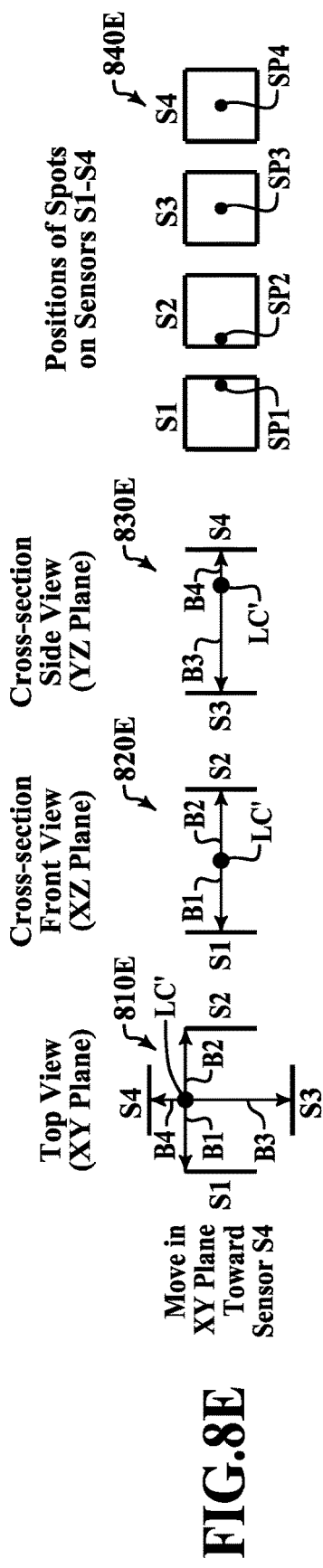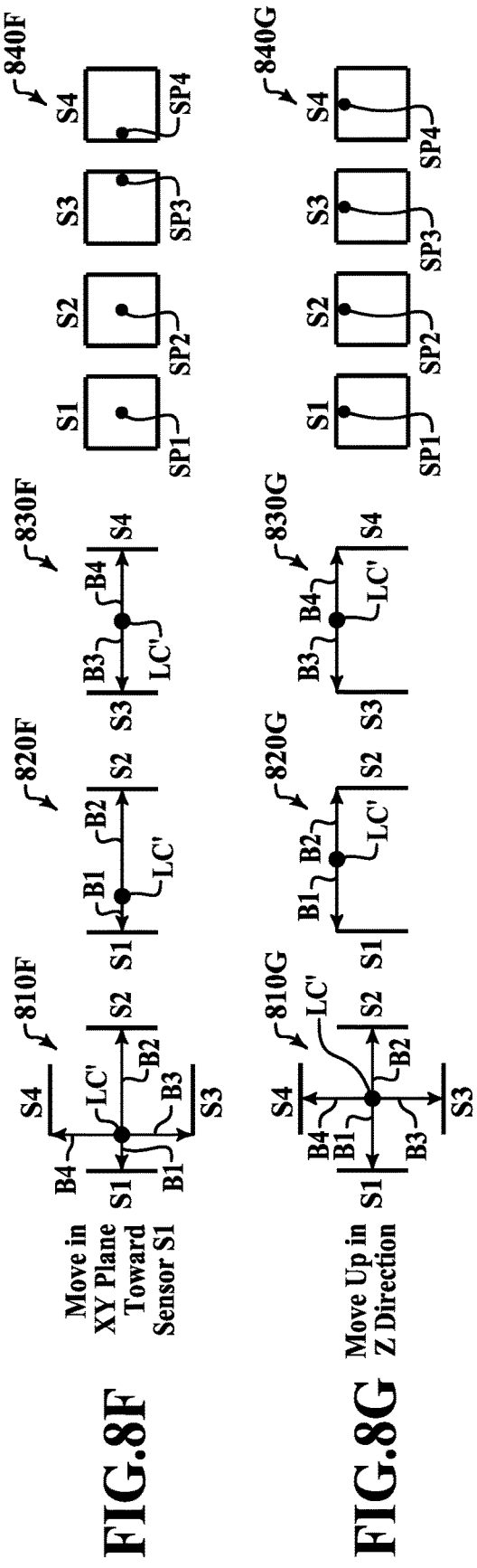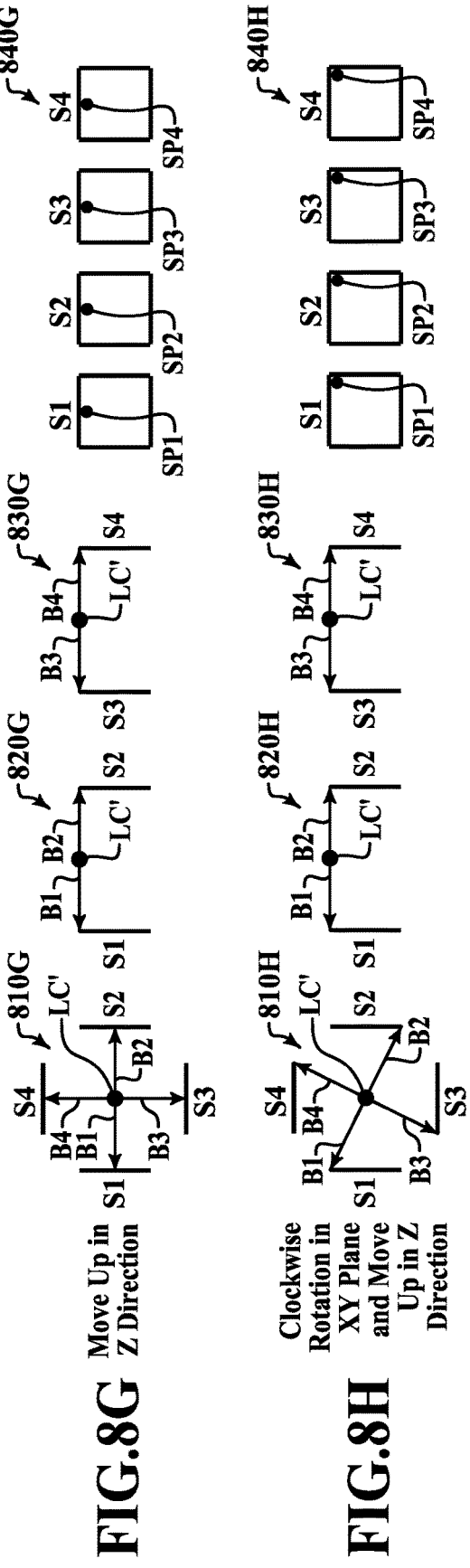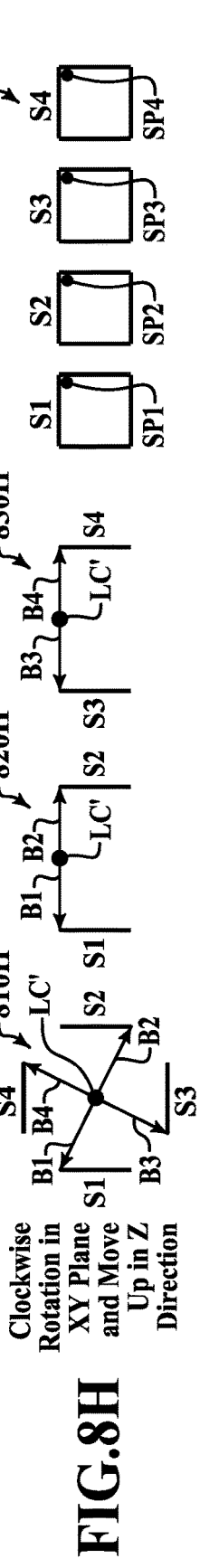

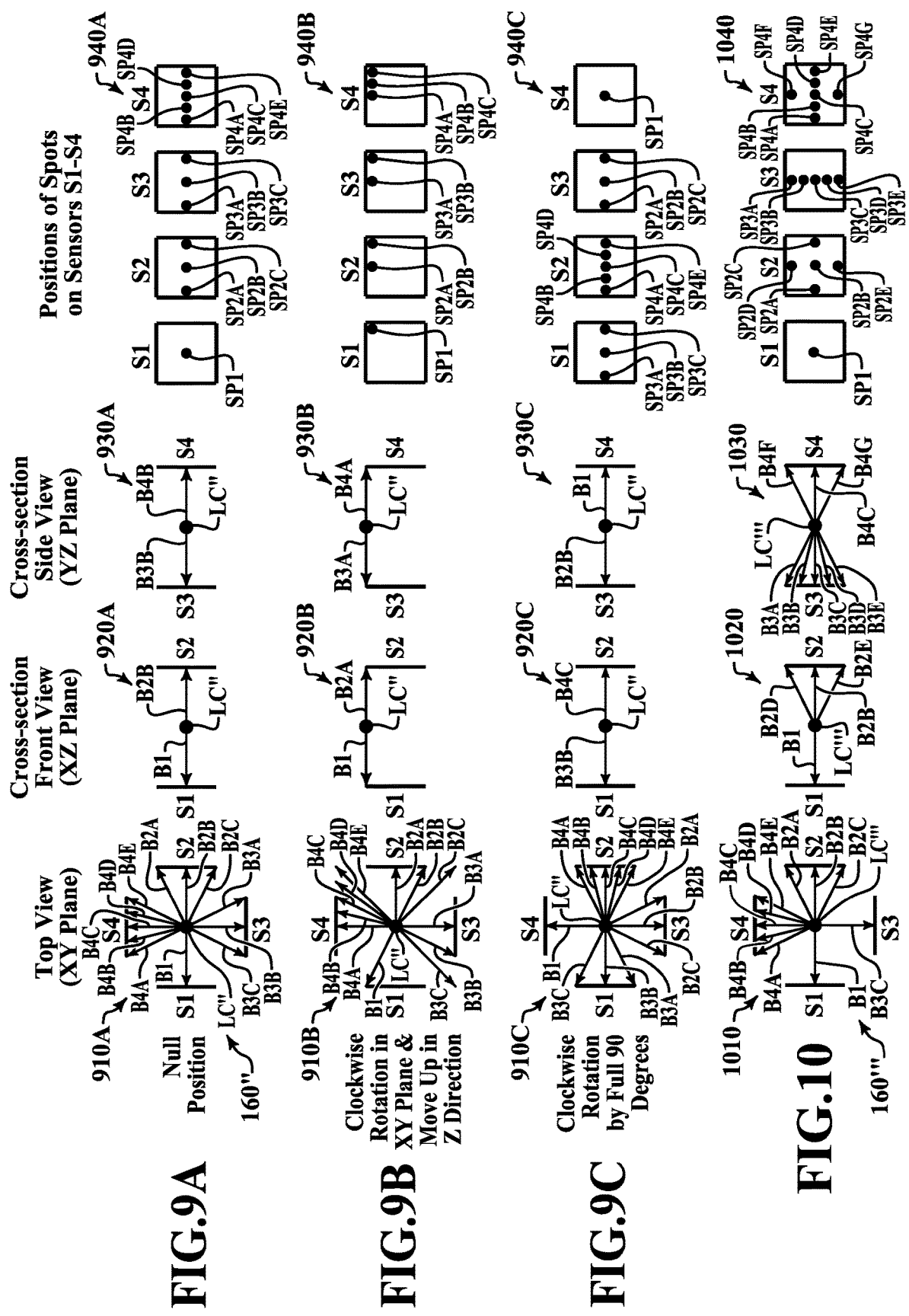

METROLOGY SYSTEM WITH POSITION AND ORIENTATION TRACKING UTILIZING LIGHT BEAMS

BACKGROUND

Technical Field

This disclosure relates to metrology and movement systems, and more particularly to a metrology system that may be utilized with a movement system, such as a robot, for tracking position and orientation.

Description of the Related Art

Manufacturing, workpiece inspection, and other processes frequently use mechanical movement systems for performing certain functions. For example, robot systems or other movement systems may be utilized to move an end tool for performing certain operations (e.g., in relation to workpiece inspection, manufacturing, etc.). For certain applications, various types of robots that may be utilized include articulated robots, selective compliance articulated robot arm (SCARA) robots, Cartesian robots, cylindrical robots, spherical robots, etc. As one example of components that may be included in a robot, a SCARA robot system (e.g., which may be a type of articulated robot system) may typically have a base, with a first arm portion rotationally coupled to the base, and a second arm portion rotationally coupled to an end of the first arm portion. In various configurations, an end tool may be coupled to an end of the second arm portion (e.g., for performing certain work and/or inspection operations). Such systems may include position sensors (e.g., rotary encoders) utilized for determining/controlling the positioning of the arm portions and correspondingly the positioning of the end tool. In various implementations, such systems may have a positioning accuracy of approximately 100 microns, as limited by certain factors (e.g., the rotary encoder performance in combination with the mechanical stability of the robot system, etc.).

U.S. Pat. No. 4,725,965 (referred to herein as the '965 patent), which is hereby incorporated herein by reference in its entirety, discloses certain calibration techniques for improving the accuracy of a SCARA system. As described in the '965 patent, a technique is provided for calibrating a SCARA type robot comprising a first rotatable arm portion and a second rotatable arm portion which carries an end tool. The calibration technique is in relation to the fact that the SCARA robot may be controlled using a kinematic model, which, when accurate, allows the arm portions to be placed in both a first and second angular configuration at which the end tool carried by the second arm portion remains at the same position. To calibrate the kinematic model, the arm portions are placed in a first configuration to locate the end tool above a fixed datum point. Then, the arm portions are placed in a second angular configuration to nominally locate the end tool again in registration with the datum point. The error in the kinematic model is computed from the shift in the position of the end tool from the datum point when the arm portions are switched from the first to the second angular configuration. The kinematic model is then compensated in accordance with the computed error. The steps are repeated until the error reaches zero, at which time the kinematic model of the SCARA robot is considered to be calibrated.

As further described in the '965 patent, the calibration technique may include the use of certain cameras. For example, in one implementation, the datum point may be the center of the viewing area of a stationary television camera (i.e., located on the ground below the end tool), and the output signal of the camera may be processed to determine the shift in the position of the end tool from the center of the viewing area of the camera when the links are switched from the first to the second configuration. In another implementation, the second arm portion may carry a camera, and the technique may begin by placing the arm portions in a first angular configuration, at which a second predetermined interior angle is measured between the arm portions, to center the camera carried by the second arm portion directly above a fixed datum point. The arm portions are then placed in a second angular configuration, at which an interior angle, equal to the second predetermined interior angle, is measured between the arm portions, to nominally center the camera again above the datum point. The output signal of the camera is then processed to determine the shift in the position of the datum point, as seen by the camera, upon switching the arm portions from the first to the second angular configuration. The error in the known position of the camera is then determined in accordance with the shift in the position of the datum point as seen by the camera. The steps are then repeated as part of the calibration process until the error approaches zero.

While techniques such as those described in the '965 patent may be utilized for calibrating a robot system, in certain applications it may be less desirable to utilize such techniques (e.g., which may require significant time and/or may not provide a desired level of accuracy for all possible orientations of a robot during certain operations, etc.). A system that can provide improvements with regard to such issues (e.g., for increasing the reliability, repeatability, speed, etc., of position and orientation determination for processes such as workpiece measurements, manufacturing, etc.) would be desirable.

BRIEF SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A metrology system is provided for use with a movement system that moves an end tool. The movement system includes a movable configuration and a motion control system. The movable configuration comprises an end tool mounting configuration that an end tool is configured to mount to. The motion control system is configured to control an end tool position and orientation, based at least in part on controlling the movable configuration so as to move at least a portion of an end tool that is mounted to the end tool mounting configuration within a movement volume.

The metrology system includes a sensor configuration, a light beam source configuration and a processing portion. The sensor configuration comprises a plurality of light beam sensors. The light beam source configuration is configured to direct light beams to the light beam sensors of the sensor configuration.

One of the light beam source configuration or the sensor configuration is configured to be coupled to at least one of an end tool or the end tool mounting configuration. In an implementation where the light beam source configuration is coupled to at least one of the end tool or the end tool mounting configuration, the position and orientation of the light beam source configuration may be indicative of a position and orientation of the end tool, and the plurality of light beam sensors may be located at fixed positions which at least in part define a metrology frame volume that is located around at least part of the movement volume. In an implementation where the sensor configuration is coupled to at least one of the end tool or the end tool mounting configuration, the position and orientation of the sensor configuration may be indicative of a position and orientation of the end tool, and a plurality of light beam source portions of the light beam source configuration may be located at fixed positions which at least in part define a metrology frame volume that is located around at least part of the movement volume.

The light beams that are directed to the light beam sensors are configured to (e.g., by producing measurement spots in positions on the light beam sensors) cause the light beam sensors to produce corresponding measurement signals. The processing portion is configured to process the measurement signals from the light beam sensors of the sensor configuration, wherein the measurement signals from the light beam sensors indicate the position and orientation of the end tool.

According to a further aspect, a method is provided that includes generally two steps. A first step includes operating a light beam source configuration to direct light beams to light beam sensors of a sensor configuration to indicate a position and orientation of an end tool. A second step includes processing the measurement signals from the light beam sensors of the sensor configuration to determine the position and orientation of the end tool.

According to a further aspect, a metrology system is provided including a sensor configuration, a light beam source configuration, and a processing portion. One of the light beam source configuration or the sensor configuration is configured to be coupled to at least one of an end tool or an end tool mounting configuration of a movement system that moves the end tool. The sensor configuration comprises a plurality of light beam sensors. The light beam source configuration is configured to direct light beams to the light beam sensors of the sensor configuration. The processing portion is configured to process the measurement signals from the light beam sensors of the sensor configuration, wherein the measurement signals from the light beam sensors indicate a position and orientation of the end tool.

BRIEF DESCRIPTION OF THE SEVERAL VIEWS OF THE DRAWINGS

FIGS. 8A-8H are diagrams illustrating four example light beams of a light beam source configuration and corresponding measurement spots on four sensors of a sensor configuration for different positions and orientations of the light beam source configuration;

FIGS. 9A-9C are diagrams illustrating twelve example light beams of a light beam source configuration and corresponding measurement spots on four sensors of a sensor configuration for different positions and orientations of the light beam source configuration;

FIG. 10 is a diagram illustrating eighteen example light beams of a light beam source configuration and corresponding measurement spots on four sensors of a sensor configuration;

DETAILED DESCRIPTION

Figure 1:
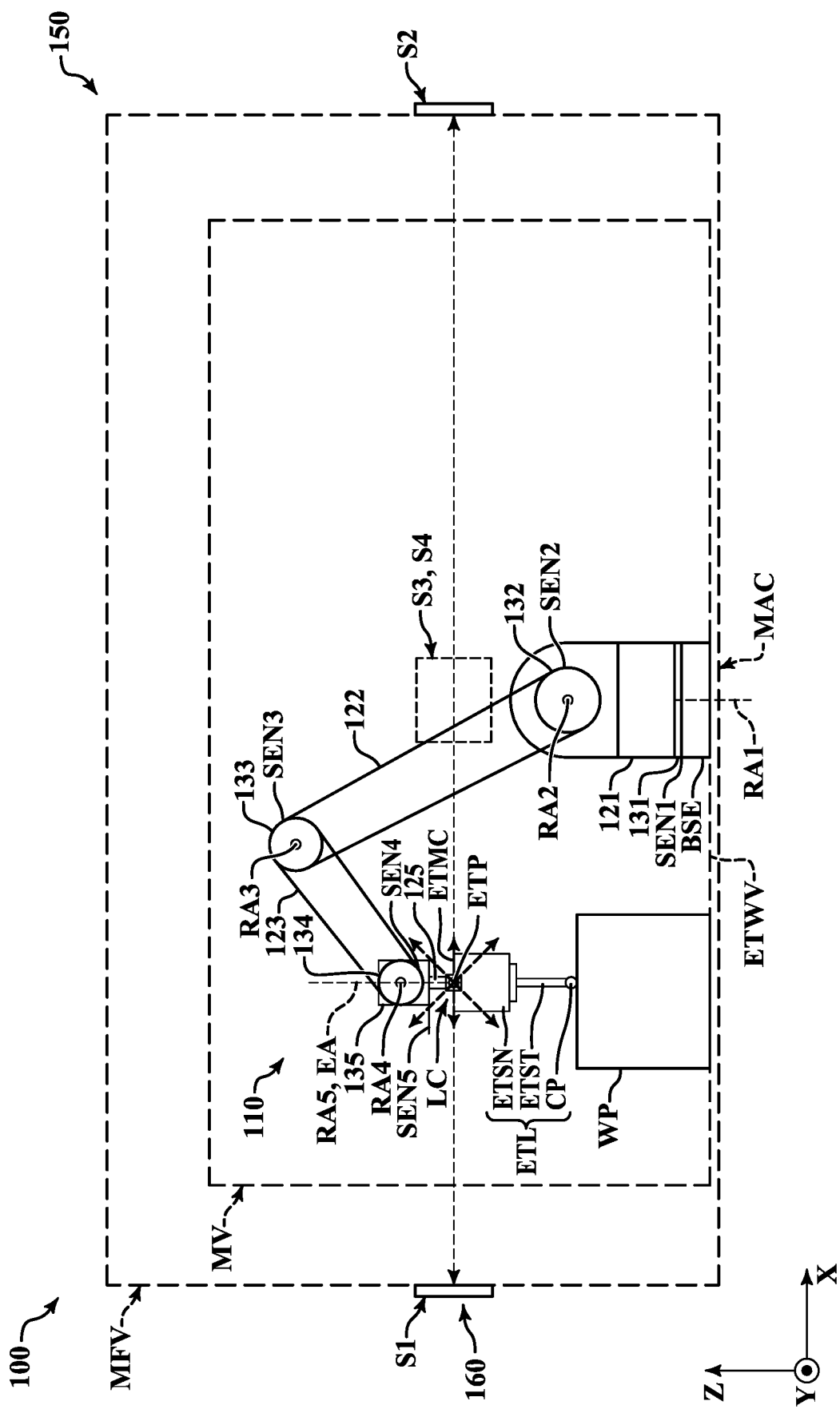
FIG. 1 is a block diagram of a first exemplary implementation of a movement and metrology system.

FIG. 1 is a block diagram of a first exemplary implementation of a movement and metrology system 100 including a movement system 110 and a metrology system 150. The movement system 110 (e.g., an articulated robot) includes a movable configuration MAC (e.g., a movable arm configuration) and a motion control and processing system 140. The metrology system 150 includes a sensor configuration 160, a light beam source configuration LC, and a metrology system position and orientation processing portion 190. In the configuration of FIG. 1, the light beam source configuration LC (e.g., illustrated as directing arrowed light beams in different directions, including toward the light beam sensors S1 and S2) is coupled to the end tool ETL. As will be described in more detail below, the metrology system 150 may be utilized for tracking a position and orientation (e.g., of the end tool ETL as moved by the movement system 110).

In the example of FIG. 1, the movable configuration MAC includes a lower base portion BSE, arm portions 121-125, motion mechanisms 131-135, position sensors SEN1-SEN5, and an end tool mounting configuration ETMC. In various implementations, some or all of the arm portions 121-125 may be mounted to respective motion mechanisms 131-135 at respective proximal ends of the respective arm portions 121-125. In the example of FIG. 1, some or all of the motion mechanisms 131-135 (e.g., rotary joints with corresponding motors) may enable motion (e.g., rotation) of the respective arm portions 121-125 (e.g., about respective rotary axes RA1-RA5). In various implementations, the position sensors SEN1-SEN5 (e.g., rotary encoders) may be utilized for determining the positions (e.g., angular orientations) of the respective arm portions 121-125.

In various implementations, the movable configuration MAC may have a portion that is designated as a terminal portion (e.g., the fifth arm portion 125). In the example configuration of FIG. 1, the end tool mounting configuration ETMC is located proximate to (e.g., located at) the distal end of the fifth arm portion 125 (e.g., designated as the terminal portion), which corresponds to a distal end of the movable configuration MAC. In various alternative implementations, a terminal portion of a movable configuration may be an element (e.g., a rotatable element, etc.) that is not an arm portion but for which at least part of the terminal portion corresponds to a distal end of the movable configuration where the end tool mounting configuration ETMC is located.

In various implementations, the end tool mounting configuration ETMC may include various elements for coupling and maintaining the end tool ETL proximate to the distal end of the movable configuration MAC. For example, in various implementations, the end tool mounting configuration ETMC may include an autojoint connection, a magnetic coupling portion and/or other coupling elements as are known in the art for mounting an end tool ETL to a corresponding element. The end tool mounting configuration ETMC may also include electrical connections (e.g., a power connection, one or more signal lines, etc.) for providing power to and/or sending signals to and from at least part of the end tool ETL (e.g., to and from the end tool sensing portion ETSN).

In various implementations, the end tool ETL may include the end tool sensing portion ETSN and an end tool stylus ETST with a contact point CP (e.g., for contacting a surface of a workpiece WP). The fifth motion mechanism 135 is located proximate to the distal end of the fourth arm portion 124. In various implementations, the fifth motion mechanism 135 (e.g., a rotary joint with a corresponding motor) may be configured to rotate the fifth arm portion 125 about a rotary axis RA5. In some implementations, the fifth motion mechanism 135 may also or alternatively include a different type of motion mechanism (e.g., a linear actuator) that is configured to move the fifth arm portion 125 linearly (e.g., up and down). In any case, the end tool ETL is mounted to (e.g., coupled to) the end tool mounting configuration ETMC, and has a corresponding end tool position ETP with corresponding coordinates (e.g., x, y and z coordinates). In various implementations, the end tool position ETP may correspond to or be proximate to the position of the end tool mounting configuration ETMC (e.g., at or proximate to the distal end DE5 of the fifth arm portion 125, which may correspond to the distal end of the movable configuration MAC).

Figure 2:
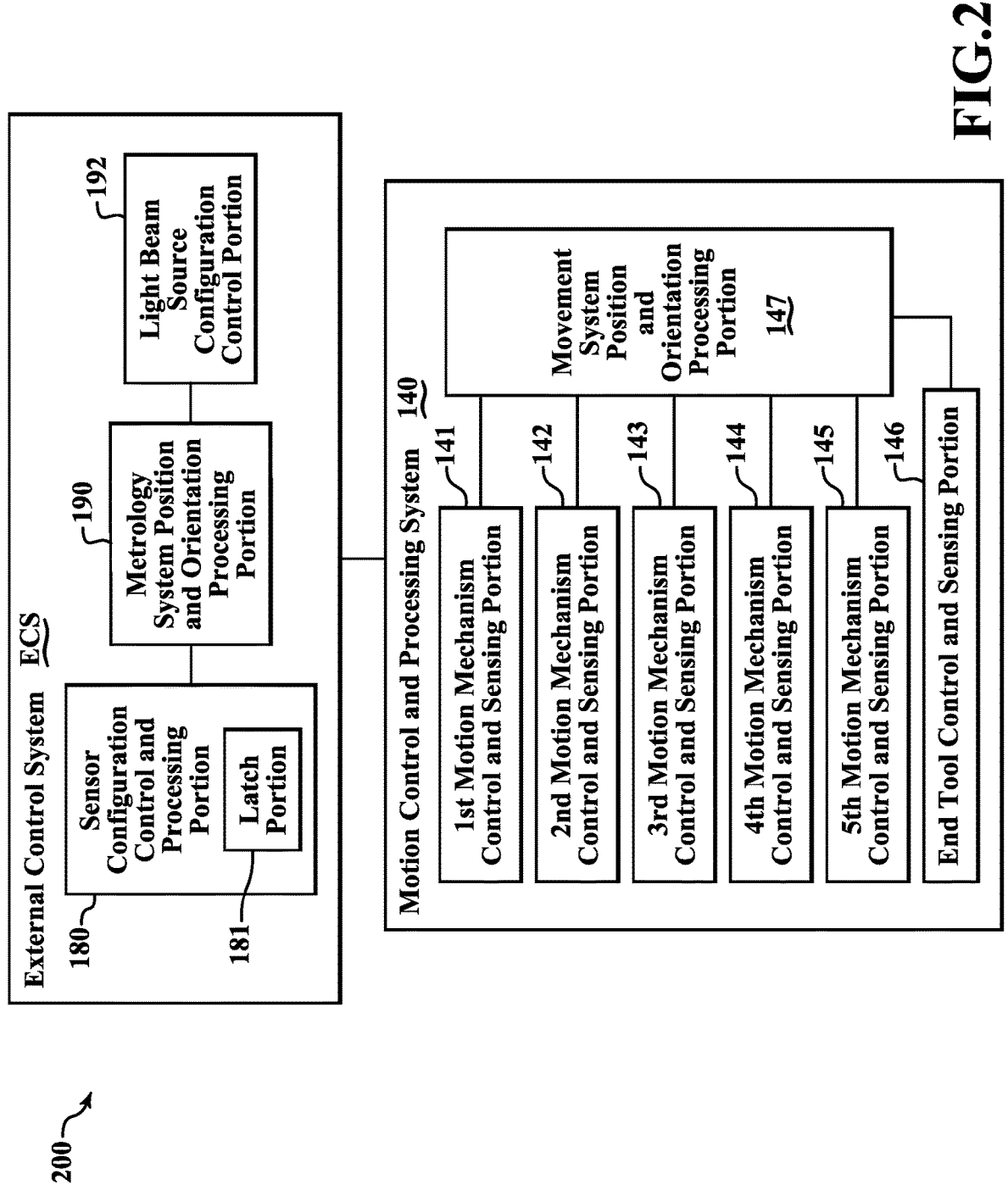
FIG. 2 is a block diagram of control and processing portions of the system of FIG. 1.

FIG. 2 is a block diagram of control and processing portions 200 of the system of FIG. 1, which include a motion control system 140 (e.g., which may also be a processing system) and which include at least portions of an external control system ECS. The motion control and processing system 140 is configured to control the end tool position ETP of the end tool ETL with a level of accuracy defined as a movement system accuracy. More specifically, the motion control and processing system 140 is generally configured to control the coordinates (e.g., x, y and z coordinates) of the end tool position ETP with the movement system accuracy based at least in part on utilizing the motion mechanisms 131-135 and position sensors SEN1-SEN5 for sensing and controlling the positions of the arm portions 121-125. In various implementations, the motion control and processing system 140 may include motion mechanism control and sensing portions 141-145 that may respectively receive signals from the respective position sensors SEN1-SEN5, for sensing the positions (e.g., angular positions, linear positions, etc.) of the respective arm portions 121-125, and/or may provide control signals to the respective motion mechanisms 131-135 (e.g., including motors, linear actuators, etc.) for moving the respective arm portions 121-125.

The motion control and processing system 140 may also receive signals from the end tool sensing portion ETSN. In various implementations, the end tool sensing portion ETSN may include circuitry and/or configurations related to the operations of the end tool ETL (e.g., for sensing a workpiece WP, etc.). As will be described in more detail below, in various implementations, the end tool ETL (e.g., a touch probe, a scanning probe, a camera, etc.) may be utilized for contacting or otherwise sensing surface locations/positions/points on a workpiece WP, for which various corresponding signals may be received, determined and/or processed by the end tool sensing portion ETSN, which may provide corresponding signals to the motion control and processing system 140. In various implementations, the motion control and processing system 140 may include an end tool control and sensing portion 146 that may provide control signals to and/or receive sensing signals from the end tool sensing portion ETSN. In various implementations, the end tool control and sensing portion 146 and the end tool sensing portion ETSN may be merged and/or indistinguishable. In various implementations, the motion mechanism control and sensing portions 141-145 and the end tool control and sensing portion 146 may all provide outputs to and/or receive control signals from a movement system position and orientation processing portion 147 which may control and/or determine the overall positioning and orientation of the movable configuration MAC of the movement system 110 and corresponding position and orientation of the end tool ETL as part of the motion control and processing system 140. In various implementations, the position of the end tool ETL may be referenced as the end tool position ETP. In general, the motion control system 140 is configured to control the end tool position and orientation, based at least in part on controlling the movable configuration MAC so as to move at least a portion of the end tool ETL that is mounted to the end tool mounting configuration ETMC within a movement volume MV.

In various implementations, the metrology system 150 may be included with or otherwise added to a movement system 110 (e.g., as part of a retrofit configuration for being added to an existing movement system 110, etc.). In general, the metrology system 150 may be utilized to provide a determination of the position and orientation of the end tool ETL (e.g., with an improved level of accuracy relative to the accuracy of the movement system 110). More specifically, as will be described in more detail below, the metrology system 150 may be utilized to determine a relative position that is indicative of the metrology position coordinates of the end tool position ETP and an orientation of the end tool ETL, with an accuracy level that is better than the movement system accuracy.

Figure 4:
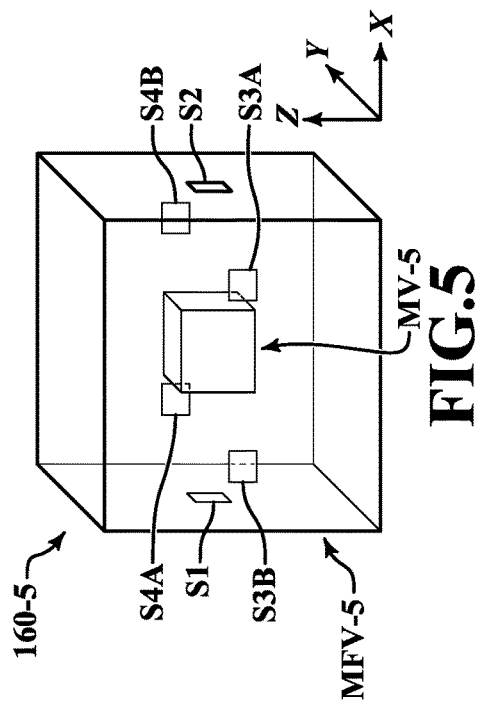
FIG. 4 is a diagram of a movement volume as surrounded by a metrology frame volume which is defined at least in part by a sensor configuration including four sensors.

In various implementations, the sensor configuration 160 of the metrology system 150 includes light beam sensors S1-S4 (e.g., as will be described in more detail below with respect to FIGS. 4-10). In FIG. 1, the light beam sensors S1 and S2 are shown on the far left and right in the illustrated cross-sectional view, respectively, and the general positions of the light beam sensors S3 and S4 (e.g., which would be located out of and into the page, respectively) are indicated by a dotted line representation. As will be described in more detail below, FIG. 4 illustrates a three dimensional view of a sensor configuration 160-4 with four light beam sensors and a similar structure as the sensor configuration 160 of FIG. 1.

The light beam sensors S1-S4 are located at fixed positions (e.g., as may each be located on a frame, wall or other structure, etc.) which at least in part define a metrology frame volume MFV. The metrology frame volume MFV is configured to be located around at least part of the movement volume MV (e.g., in which the at least part of the end tool ETL is moved by the movement system 110). The light beam source configuration LC is configured to be operated (e.g., by a light beam source configuration control portion 192) to direct light beams to the light beam sensors S1-S4 of the sensor configuration 160 (e.g., to indicate a position and orientation of the light beam source configuration LC).

The light beam source configuration LC is configured to be coupled to at least one of the end tool ETL or the end tool mounting configuration ETMC. It will be appreciated that when the end tool ETL is coupled to the end tool mounting configuration ETMC, the light beam source configuration LC is then coupled to both the end tool ETL and the end tool mounting configuration ETMC. The position and orientation of the light beam source configuration LC are indicative of the position and orientation of the end tool ETL. As will be described in more detail below with respect to FIGS. 8A-10, the light beams that are directed to the light beam sensors S1-S4 are configured to produce measurement spots SP in positions on the light beam sensors that cause the light beam sensors to produce corresponding measurement signals. The metrology system position and orientation processing portion 190 is configured to process the measurement signals from the light beam sensors S1-S4 of the sensor configuration 160, wherein the measurement signals from the light beam sensors S1-S4 indicate the position and orientation of the light beam source configuration LC, and correspondingly of the end tool ETL.

In various implementations, the movement volume MV consists of a volume in which at least a portion of at least one of the end tool ETL and/or the light beam source configuration LC may be moved. In the example of FIG. 1, the movement volume MV is illustrated as including a volume in which the contact point CP of the end tool ETL may be moved when inspecting a workpiece. As one alternative example, a movement volume may alternatively include a volume in which the light beam source configuration LC may move when the end tool ETL is moved for inspecting a workpiece. In various implementations, the movement system 110 is configured to move the movable configuration MAC so as to move at least a portion of an end tool ETL (e.g., including the contact point CP) that is mounted to the end tool mounting configuration ETMC along at least two dimensions (e.g., x and y dimensions) in the movement volume MV. In the example of FIG. 1, the portion of the end tool ETL (e.g., the contact point CP) is movable by the movement system 110 along three dimensions (e.g., x, y and z dimensions).

In various implementations, a latch portion 181 and/or the metrology system position and orientation processing portion 190 and/or the light beam source configuration control portion 192 may be included as part of an external control system ECS (e.g., as part of an external computer, etc.). The light beam source configuration control portion 192 may provide power and/or control signals to the light beam source configuration LC and/or portions thereof (e.g., to one or more light beam sources of the light beam source configuration LC, etc.). The latch portion 181 may be included as part of a sensor configuration control and processing portion 180 (e.g., which may provide power and/or receive measurement signals from and/or provide control signals to the light beam sensors S1-S4 of the sensor configuration 160, and which may provide such signals and/or other signals to and from the metrology system position and orientation processing portion 190).

In various implementations, the latch portion 181 is configured to input at least one input signal that is related to the end tool position ETP and to determine the timing of a trigger signal based on the at least one input signal, and to output the trigger signal to at least one of the metrology system position and orientation processing portion 190 or the light beam sensors S1-S4 of the sensor configuration 160. In various implementations, the metrology system position and orientation processing portion 190 and/or the sensor configuration 160 are configured to determine current measurement signals from the light beam sensors S1-S4 (e.g., as corresponding to a current position and orientation of the light beam source configuration LC and/or end tool ETL) in response to receiving the trigger signal. In various implementations, the metrology system position and orientation processing portion 190 is configured to process the measurement signals as corresponding to the timing of the trigger signal to determine a position and orientation of the light beam source configuration LC and/or end tool ETL at the time of the trigger signal.

In various implementations, once a position and orientation of the light beam source configuration LC is determined, the position and orientation of the end tool may correspondingly be determined (e.g., in accordance with known geometric relationships, relative positioning, offsets etc., between the light beam source configuration LC and the end tool ETL). In various implementations, the light beam source configuration LC may be directly attached to the end tool ETL, or attached at or very close to the end tool mounting configuration (e.g., such that there is minimal or no separation between the end tool ETL and the light beam source configuration LC). In the implementation of FIG. 1, the light beam source configuration LC is illustrated as being at, or at least proximate to, the end tool position ETP (e.g., a designated reference position for the end tool ETL). Such configurations may reduce the complexity and/or otherwise improve the accuracy of a determination of the position and orientation of the end tool ETL as calculated in relation to a determined position and orientation of the light beam source configuration LC.

In various implementations, the determination of the position and orientation of the end tool ETL may further be utilized for determining certain additional position information (e.g., for determining the position of the contact point CP). As noted above, in various implementations, measurements of a workpiece surface may be determined by touching a contact point CP of an end tool ETL to a workpiece surface. In relation to such measurements, both the position and orientation of the end tool ETL may be determined, which may correspondingly indicate the position of the contact point CP.

In various implementations, different types of end tools ETL may provide different types of outputs that may be utilized with respect to the latch portion 181. For example, in an implementation where the end tool ETL is a touch probe that is used for measuring a workpiece and that outputs a touch signal when it touches the workpiece (e.g., when the contact point CP contacts the workpiece), the latch portion 181 may be configured to input that touch signal or a signal derived therefrom as the at least one input signal that the timing of a trigger signal is determined based on. In various implementations where the end tool ETL is a touch probe, a central axis of the touch probe may correspond to an end tool axis EA. As another example, in an implementation where the end tool ETL is a scanning probe that is used for measuring a workpiece and that provides respective workpiece measurement sample data corresponding to a respective sample timing signal, the latch portion 181 may be configured to input that respective sample timing signal or a signal derived therefrom as the at least one input signal. As another example, in an implementation where the end tool ETL is a camera that is used to provide a respective workpiece measurement image corresponding to a respective workpiece image acquisition signal, the latch portion 181 may be configured to input that workpiece image acquisition signal or a signal derived therefrom as the at least one input signal.

In various implementations, the metrology system 150 may be configured to determine the position and orientation of the light beam source configuration and/or end tool ETL, based on the measurement signals from the light beam sensors S1-S4 of the sensor configuration 160. It will be appreciated that such a system may have certain advantages over various alternative systems. For example, in various implementations a system such as that disclosed herein may be smaller and/or less expensive and/or more accurate than certain alternative systems utilizing alternative technologies (e.g., including certain photogrammetry systems, etc.) as may alternatively be utilized for tracking movement system positions and orientations. The disclosed system also does not take up or obscure any part of the movement volume MV, such as alternative systems that may include a scale or fiducial on the ground or stage, or otherwise in the same area (e.g., in the movement volume MV) where workpieces may otherwise be worked on and/or inspected, etc.

In various implementations, a comparison between a photogrammetry system and the metrology system 150 as disclosed herein may be described as follows. A photogrammetry system may utilize incoherent light sources, for which cameras are utilized to image the light sources, for determining the positions. In some instances, position and angle may be calculated from the source positions. The effective 'lever arm' for determining the angle is the distances between the sources. This is difficult to increase as it necessarily also increases the counteractive lever arm between the source and the lower portion of the end tool (e.g., corresponding to a distance, such as along an end tool axis EA direction, between the source and the contact point CP of the end tool). In other words, photogrammetry configurations which attempt to make it easier to measure the probe angle, also make the end tool position more sensitive to this angle. The camera's field of view in such systems may be the entire working volume, corresponding to a low magnification.

In contrast, in the metrology system 150 as disclosed herein, coherent light sources may typically be utilized. For example, the light sources for the light beam source configuration LC may be coherent light sources (e.g., laser light sources), for which the light beams may be coherent light beams (e.g., laser beams). Diffractive optical elements (e.g., as will be described in more detail below with respect to FIG. 3) may be utilized to produce many diffracted light beams (e.g., which can be dispersed in many directions surrounding the light source configuration LC). In various implementations, a relatively small fraction of the many diffracted or otherwise provided light beams may be directed to or otherwise received by the distributed light beam sensors of the metrology system 150 (e.g., to produce corresponding measurement spots SP on the light beam sensors). In various implementations, the light beam sensors may be two dimensional position sensitive sensors (e.g., lensless cameras, position sensitive detectors, optical position sensors that can measure a position of a light spot in two-dimensions on a sensor surface, etc.). In operation, the large lever arms (e.g., corresponding in part to the distances between the light beam source configuration LC and the light beam sensors S) enable highly accurate orientation (e.g., corresponding to an angle of an end tool, etc.) measurements/determinations. In addition, the effective magnifications for such operations may be relatively high.

In various implementations, measurement signals from the light beam sensors (e.g., indicating two dimensional positions of measurement spots SP formed by the light beams, for which a centroid of each measurement spot may be calculated/determined in terms of XYZ coordinates) may be utilized in combination with the known characteristics of the light beam source configuration LC (e.g., including laser projection based on the known geometric relationships of the light beams including the relative three dimensional angles of each light beam and accounting for any offsets of each light beam at its source, etc.) to calculate/determine the position and orientation (e.g., as based on using nonlinear least squares and/or other processing/calculation techniques). Stated another way, the known vectors of the light beams may be fit to the known locations (e.g., in XYZ coordinates) that they intersect on the light beam sensors (e.g., in terms of the positions of the measurement spots SP) to determine the position and orientation of the light beam source configuration LC. In various implementations, the measurement spots SP on the light beam sensors may each be uniquely identified (e.g., in part by utilizing coarse position information determined from the movement system 110, and/or based on unique or otherwise identifiable characteristics of the light beams, such as unique pattern information of the light beams, such as a pseudo-random pattern with unique or otherwise identifiable portions, etc.).

It will be appreciated that the combination of such features and characteristics of the metrology system 150 may result in higher accuracy position and orientation determinations than those provided by a photogrammetry system such as that described above. As some particular advantages, it is noted that the light beams as utilized in the metrology system 150 have corresponding orientation information that is lacking in photogrammetry and is more sensitive to the orientation (e.g., of the light beam source configuration LC and the end tool ETL). This can increase accuracy by a large amount. In addition, the measurement spots SP can be detected directly on the light beam sensors instead of imaged, thus avoiding certain potential aberration errors, etc.

Figure 3:
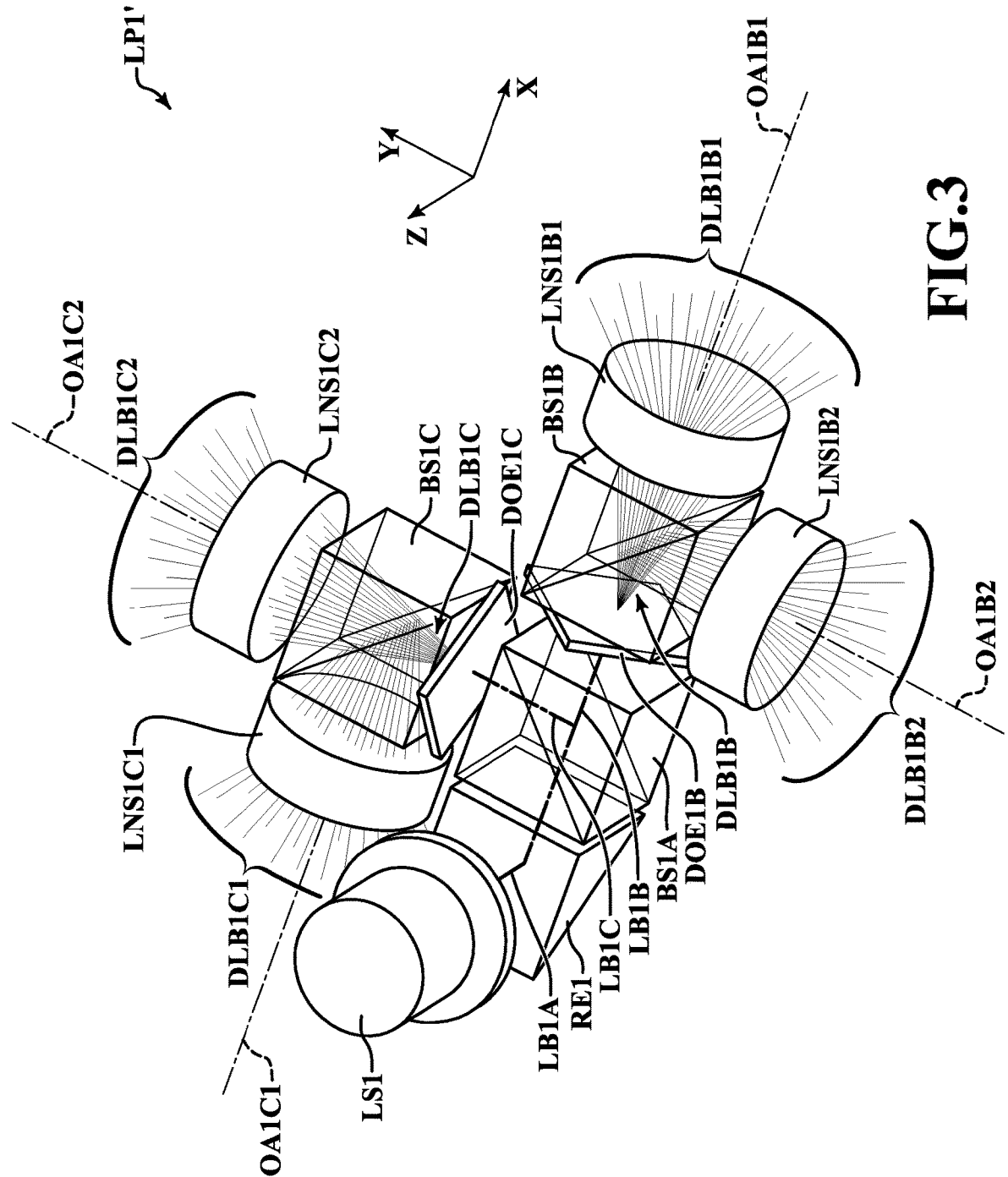
FIG. 3 is a diagram of a first exemplary implementation of a light beam source portion of a light beam source configuration such as may be utilized in the system of FIG. 1.

FIG. 3 is a diagram of a first exemplary implementation of a light beam source portion LP1' of a light beam source configuration LC (e.g., such as may be similar to the light beam source configuration LC utilized in the system of FIG. 1). As illustrated in FIG. 3, the light beam source portion LP1' includes a light source LS1, a reflective element RE1, beamsplitters BS1A, BS1B, BS1C, diffractive optical elements DOE1B, DOE1C, and lenses LNS1B1, LNS1B2, LNS1C1 and LNS1C2. In various implementations, the light source LS1 may be a laser source, for which at least some or all of the light beams in the following description may be laser beams. The light source LS1 produces a light beam LB1A, which is reflected by reflective element RE1 to be directed toward the beamsplitter BS1A, which splits the light beam into light beams LB1B and LB1C, which are directed to the diffractive optical elements DOE1B and DOE1C, respectively.

The light beam LB1B is diffracted by the diffractive optical element DOE1B into diffracted light beams DLB1B, which are split by beamsplitter BS1B into diffracted light beams DLB1B1 and DLB1B2. The diffracted light beams DLB1B1 further diverge after passing through the lens LNS1B1, which has an optical axis OA1B1, and the diffracted light beams DLB1B2 further diverge after passing through the lens LNS1B2, which has an optical axis OA1B2. Similarly, the light beam LB1C is diffracted by the diffractive optical element DOE1C into diffracted light beams DLB1C, which are split by beamsplitter BS1C into diffracted light beams DLB1C1 and DLB1C2. The diffracted light beams DLB1C1 further diverge after passing through the lens LNS1C1 which has an optical axis OA1C1, and the diffracted light beams DLB1C2 further diverge after passing through the lens LNS1C2, which has an optical axis OA1C2.

Orthogonal X, Y and Z axes are indicated (e.g., as corresponding to a coordinate system for the light beam source portion LP1' and/or light beam source configuration). The optical axes OA1B1 and OA1C1 are indicated to be parallel to the X-axis, and the optical axes OA1B2 and OA1C2 are indicated to be parallel to the Y-axis.

In various implementations, the light beam source portion LP1' may be a first light beam source portion, for which the corresponding light beam source configuration may include additional light beam source portions. For example, the light beam source configuration may include second and third light beam source portions (e.g., in some instances each having identical components as the first light beam source portion LP1'). In such a configuration, for the second light beam source portion, the respective optical axes may be parallel to the X-axis and the Z-axis, and for the third light beam source portion, the respective optical axes may be parallel to the Y-axis and the Z-axis. In such a configuration, there may thus be an approximately equal number of diffracted light beams directed by lenses with optical axes in the X-axis, Y-axis and Z-axis directions. Such a configuration may result in a relatively even distribution of light beams in directions from the light beam source configuration. In one implementation, if such a light beam source configuration were placed at a center of a sphere, there may be an approximately even dispersion around the surface of the sphere of intersection points where the light beams intersect with the surface of the sphere. In various implementations, it may be desirable for a light beam source configuration LC to provide at least a minimum number of light beams as dispersed in the directions surrounding the light beam source configuration LC (e.g., such as at least 10,000 light beams, or at least 100,000 light beams, etc.). In various implementations, a desired minimum number of light beams may depend on the light beam source configuration LC/light beam sensor distance, the number and size of the light beam sensors and the range of possible light beam source configuration LC orientations. In various implementations, it may be desirable for some or all of the light beams to have a similar or an approximately equal angular spacing relative to one another.

In various implementations, each of the light beams (e.g., each of the diffracted light beams DLB in the example of FIG. 3) of a light beam source configuration may have certain known and/or determined characteristics (e.g., relative angular orientations, source points of origin, etc.) which spatially relate each light beam to the light beam source configuration. Such characteristics enable a position and orientation of the light beam source configuration to be determined, based at least in part on the light beams that are directed to and sensed by the light beam sensors of the sensor configuration. With regard to the light beam source portion LP1', it is noted that the diffracted light beams may have certain offsets in relation to one another. For example, the diffracted light beams DLB1B1 may be modeled/regarded/designated as having a source point of origin that is offset along the Y-axis direction from a modeled/regarded/designated source point of origin for the diffracted light beams DLB1C1 (e.g., as related to the offset along the Y-axis direction between the lenses LNS1B1 and LNS1C1). It will be appreciated that such offsets may be included and/or otherwise accounted for in position calculations (e.g., including the processing/calculations as performed by the metrology system position and orientation processing portion 190 for processing the measurement signals from the light beam sensors to determine the position and orientation of the light beam source configuration LC and/or end tool ETL, etc.). Once a position and orientation of the light beam source configuration LC is determined, any known geometric relationships and/or relative positioning/offsets between the light beam source configuration LC and the end tool ETL may also be utilized for determining the position and orientation of the end tool ETL. As will be described in more detail below, FIGS. 8A-10 illustrate certain simplified examples regarding light beams B of a light beam source configuration LC as directed to sensors of a sensor configuration 160, and as corresponding to certain positions and orientations of a light beam source configuration LC.

FIGS. 4, 5, 6 and 7 are diagrams of respective movement volumes MV-4, MV-5, MV-6 and MV-7 as surrounded by respective metrology frame volumes MFV-4, MFV-5, MFV-6 and MFV-7 which are defined at least in part by respective sensor configurations 160-4, 160-5, 160-6 and 160-7, which each include a respective different number of light beam sensors. In each case, the movement volume MV and metrology frame volume MFV are both represented as cubical volumes with the edges and sides parallel to the orthogonal X, Y, Z axis directions.

FIG. 4 illustrates an implementation with a sensor configuration 160-4 including four light beam sensors S1-S4 (e.g., similar to the example implementation illustrated in FIG. 1, and also in relation to the examples of FIGS. 8A-10, as will be described in more detail below). The four light beam sensors S1-S4 are disposed at positions that are all at a common middle Z-height along a Z-axis direction (i.e., all having a same Z-axis coordinate value). The light beam sensors S1 and S2 are disposed on opposite sides of the metrology frame volume and are parallel to a YZ plane. The light beam sensors S3 and S4 are disposed on opposite sides of the metrology frame volume and are parallel to an XZ plane.

Figure 5:
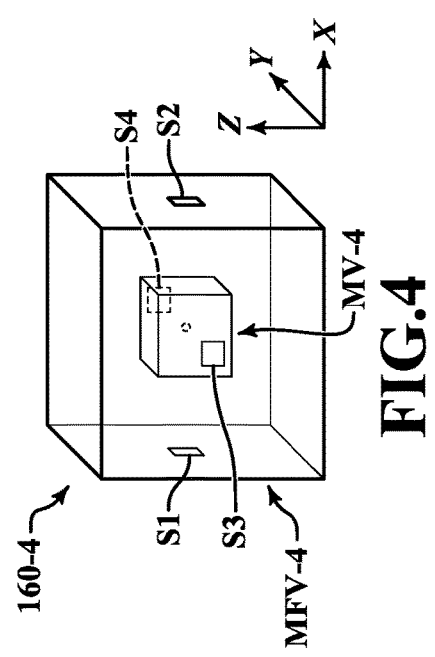
FIG. 5 is a diagram of a movement volume as surrounded by a metrology frame volume which is defined at least in part by a sensor configuration including six sensors.

FIG. 5 illustrates an implementation with a sensor configuration 160-5 including six light beam sensors S1, S2, S3A, S3B, S4A and S4B. The sets of two light beam sensors S3A and S3B, and S4A and S4B, are disposed at different positions along the X-axis direction on each respective side of the metrology frame volume MFV-5. In comparison to the implementation of FIG. 4 (i.e., with the utilization of the single light beam sensors S3 and S4 on each respective side in the implementation), it will be appreciated that the implementation of FIG. 5 may correspond to higher measurement resolution and/or higher measurement accuracy (e.g., for determinations of positions of the light beam source configuration) along the X-axis direction. Such an implementation may be advantageous for certain applications. For example, such an implementation may be utilized in an application where movements and corresponding variations in positions along the X-axis direction may be more common and/or regarded as of relatively higher importance for accurate position determinations as compared to movements and/or corresponding variations in positions along the Y-axis or Z-axis directions.

Figure 6:
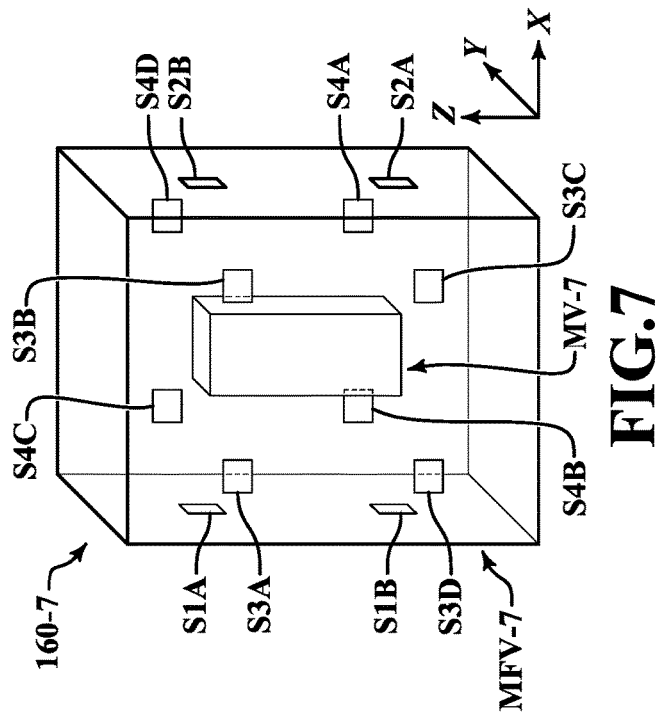
FIG. 6 is a diagram of a movement volume as surrounded by a metrology frame volume which is defined at least in part by a sensor configuration including fourteen sensors.

FIG. 6 illustrates an implementation with a sensor configuration 160-6 including fourteen light beam sensors S1A-S1D, S2A-S2D, S3A-S3C and S4A-S4C. In relation to the advantages of sensor configuration 160-5 of FIG. 5, the sensor configuration 160-6 of FIG. 6 may have even higher measurement resolution and/or higher measurement accuracy along the X-axis direction (e.g., in accordance with the sets of three light beam sensors S3A-S3C, and S4A-S4C, as disposed at different positions along the X-axis direction on each respective side of the metrology frame volume MFV-6). In addition, in comparison to the sensor configurations of FIGS. 4 and 5, the sensor configuration 160-6 of FIG. 6 may have higher measurement resolution and/or higher measurement accuracy along the Y-axis direction (e.g., in accordance with the sets of two light beam sensors S1B and S1D, and S2B and S2D, as disposed at different positions along the Y-axis direction on each respective side of the metrology frame volume MFV-6, and as compared to the configurations of FIGS. 4 and 5 with the utilization of the single light beam sensors S1 and S2 on each respective side). Furthermore, also in comparison to the sensor configurations of FIGS. 4 and 5, the sensor configuration 160-6 of FIG. 6 may also have higher measurement resolution and/or higher measurement accuracy along the Z-axis direction (e.g., in accordance with the sets of two light beam sensors S1A and S1C, and S2A and S2C, as disposed at different positions along the Z-axis direction on each respective side of the metrology frame volume MFV-6, and as compared to the configurations of FIGS. 4 and 5 with the utilization of the single light beam sensors S1 and S2 on each respective side).

Figure 7:
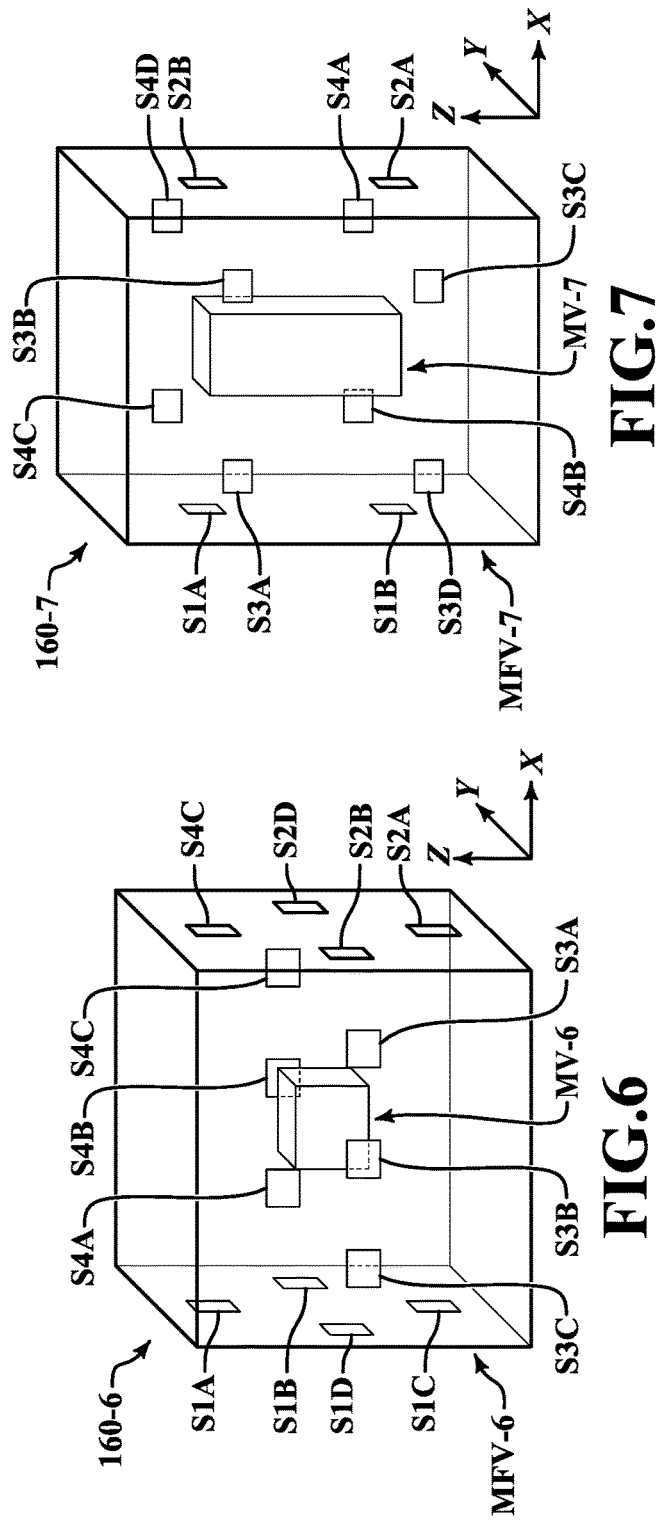
FIG. 7 is a diagram of a movement volume as surrounded by a metrology frame volume which is defined at least in part by a sensor configuration including twelve sensors.

FIG. 7 illustrates an implementation with a sensor configuration 160-7 including twelve light beam sensors S1A, S1B, S2A, S2B, S3A-S3D and S4A-S4D. The sensor configuration 160-7 in some instances may be regarded as a doubled version of the sensor configuration 160-5 of FIG. 5 (e.g., with two essentially identical configurations separated along the Z-axis direction). It is noted that the movement volume MV-7 is represented as being higher (i.e., with an increased dimension along the Z-axis direction) as compared to the movement volumes of FIGS. 4-6. In certain applications, the implementation of FIG. 7 may be utilized to provide similar measurement resolution and advantages as the implementation of FIG. 5 (e.g., including higher measurement resolution and/or higher measurement accuracy as compared to the implementation of FIG. 4 along the X-axis direction), as configured with respect to the increased movement volume MV-7 (e.g., with the larger dimension along the Z-axis direction as compared to the movement volume MV-5 of FIG. 5).

FIGS. 8A-8H are diagrams illustrating a light beam source configuration LC' that directs four example light beams B1-B4 toward four light beam sensors S1-S4 of a sensor configuration 160' and which produce four corresponding measurement spots SP1-SP4 for different positions and orientations of the light beam source configuration LC'. In various implementations, the sensor configuration 160' (e.g., and the sensor configurations 160'' and 160''' of FIGS. 9A-9C and 10) may be similar to that of FIGS. 1 and 4 (e.g., with the four light beam sensors S1-S4 at least partly defining a corresponding cubical metrology frame volume MFV). FIGS. 8A-8H illustrate respective top views 810A-810H, cross-section front views 820A-820H, cross-section side views 830A-830H, and positions of measurements spots views 840A-840H (i.e., in accordance with a front view of the sensor surface of each of the respective light beam sensors S1-S4).

In various implementations, the examples of FIGS. 8A-8H (e.g., and the examples of FIGS. 9A-9C and 10) may also be illustrative of operations of sensor configurations with a greater number of light beam sensors (e.g., such as the example configurations illustrated in FIGS. 5-7), for which the following described examples may be illustrative of the operations of four (e.g., the four most central light beam sensors, etc.) out of the total number of light beam sensors in the given configurations. The examples of FIGS. 8A-8H may also be illustrative of operations of light beam source configurations with a greater number of light beams (e.g., 10's, 100's, or 1000's, etc., of light beams, such as may in some instances be directed in relatively evenly distributed three dimensional directions, such as described above with respect to FIG. 3). In regard to such implementations, the following described examples may be illustrative of the operations of four (e.g., the four most central light beams and/or the four light beams specifically oriented along the X and Y axis directions, etc.) out of the total number of light beams in the given configurations. It will also be appreciated with respect to the examples of FIGS. 8A-8H (e.g., and with respect to the examples of FIGS. 9A-9C and 10), that the relative sizes of the light beam sensors S1-S4 appear exaggerated, the relative distances between the light beam sensors appear reduced, and that no offsets are indicated between the source points for the different light beams B1-B4, for purposes of simplifying the illustrated examples.

Figures 8A, 8B, 8C, 8D:
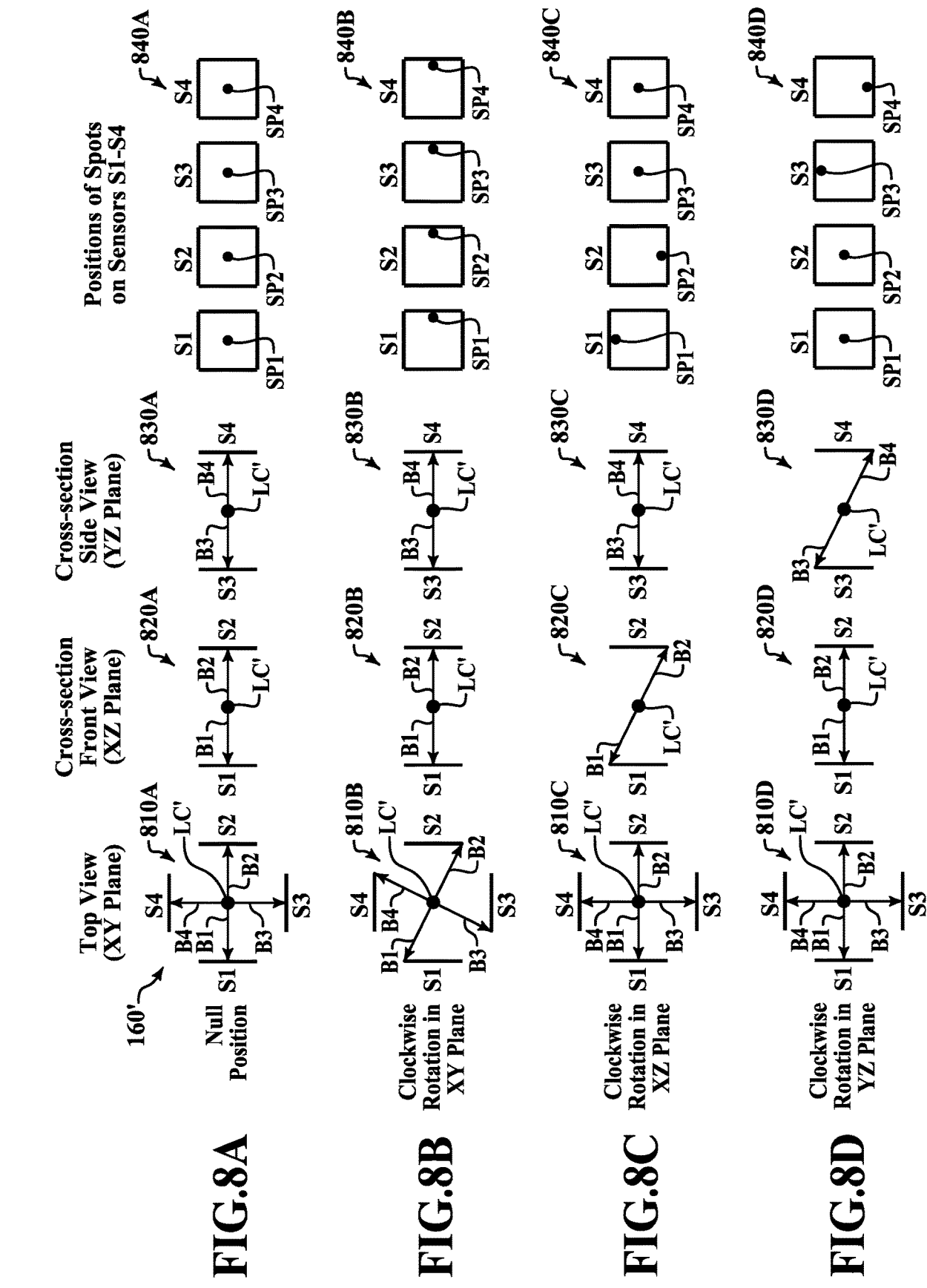

In the example of FIG. 8A, the light beam source configuration LC', and the corresponding light beams B1-B4, are illustrated as being in a designated "null" position (e.g., including a corresponding "null" orientation). More specifically, the light beams B1 and B2 are each parallel to the X-axis direction, and are each directed to the centers of the light beam sensors S1 and S2, respectively. Similarly, the light beams B3 and B4 are each parallel to the Y-axis direction, and are each directed to the centers of the light beam sensors S3 and S4, respectively. The light beams B1-B4 produce corresponding measurement spots SP1-SP4 in the centers of each of the light beam sensors S1-S4, respectively. In various implementations, the light beam sensors S1-S4 may be two dimensional position sensitive sensors (e.g., optical position sensors that can measure a position of a measurement spot, such as formed by a light beam, in two-dimensions on a sensor surface).

The light beam sensors S1-S4 may output measurement signals that indicate that the measurement spots SP1-SP4 are in the centers of the light beam sensors S1-S4. Given the known geometric relationships between the light beams B1-B4 and the light beam source configuration LC', the measurement signals from the light beam sensors S1-S4 indicate the position and orientation of the light beam source configuration LC' (e.g., as corresponding to the position and orientation of the example of FIG. 8A). The measurement signals may be processed (e.g., by a processing portion 190), for which the processing may determine the position and orientation of the light beam source configuration LC' and/or an end tool ETL to which the light beam source configuration LC' is coupled (e.g., see FIG. 1), etc.

In the example of FIG. 8B (e.g., in comparison to the example of FIG. 8A), the light beam source configuration LC' is illustrated as having been rotated clockwise in an XY plane. The view 810B (i.e., of the XY plane) illustrates the clockwise rotation and indicates the different positions of the light beams B1-B4 on the light beam sensors S1-S4. The view 840B illustrates the positions of the measurement spots SP1-SP4 on the light beam sensors S1-S4, as produced by the light beams B1-B4, respectively. More specifically, the measurement spots SP1-SP4 are shown to each have moved to the middle right of each of the light beam sensors S1-S4, respectively.

In the example of FIG. 8C (e.g., in comparison to the example of FIG. 8A), the light beam source configuration LC' is illustrated as having been rotated clockwise in an XZ plane. The view 820C (i.e., of the XZ plane) illustrates the clockwise rotation and indicates the different positions of the light beams B1 and B2 on the light beam sensors S1 and S2. In the view 840C, the measurement spots SP1 and SP2 are illustrated as having moved to the middle top and middle bottom, respectively, of the light beam sensors S1 and S2, while the measurement spots SP3 and SP4 have remained in the centers of the light beam sensors S3 and S4, respectively.

In the example of FIG. 8D (e.g., in comparison to the example of FIG. 8A), the light beam source configuration LC' is illustrated as having been rotated clockwise in a YZ plane. The view 830D (i.e., of the YZ plane) illustrates the clockwise rotation and indicates the different positions of the light beams B3 and B4 on the light beam sensors S3 and S4. In the view 840D, the measurement spots SP1 and SP2 have remained in the centers of the light beam sensors S1 and S2, respectively, while the measurement spots SP3 and SP4 are illustrated as having moved to the middle top and middle bottom, respectively, of the light beam sensors S3 and S4.

The examples of FIGS. 8B-8D are noted to each correspond at least to a change in orientation of the light beam source configuration LC'. In some implementations, the illustrated changes may not otherwise correspond to a change in position (e.g., depending on where a reference point is designated for the light beam source configuration LC', which changes in position are determined in relation to). In the examples of FIGS. 8A-10, in various implementations a reference point for a light beam source configuration may be designated as being at a geometric center, or other center, of the light beam source configuration.

In the example of FIG. 8E (e.g., in comparison to the example of FIG. 8A), the light beam source configuration LC' is illustrated as having moved in the XY plane toward the light beam sensor S4. The view 810E (i.e., of the XY plane) illustrates the different positions of the light beams B1 and B2 on the light beam sensors S1 and S2. In the view 840E, the measurement spots SP1 and SP2 are illustrated as having moved to the middle right and middle left, respectively, of the light beam sensors S1 and S2, while the measurement spots SP3 and SP4 have remained in the centers of the light beam sensors S3 and S4, respectively.

In the example of FIG. 8F (e.g., in comparison to the example of FIG. 8A), the light beam source configuration LC' is illustrated as having moved in the XY plane toward the light beam sensor S1. The view 810F (i.e., of the XY plane) illustrates the different positions of the light beams B3 and B4 on the light beam sensors S3 and S4. In the view 840F, the measurement spots SP1 and SP2 have remained in the centers of the light beam sensors S1 and S2, respectively, while the measurement spots SP3 and SP4 are illustrated as having moved to the middle right and middle left, respectively, of the light beam sensors S3 and S4.

In the example of FIG. 8G (e.g., in comparison to the example of FIG. 8A), the light beam source configuration LC' is illustrated as having been moved up in the Z direction (i.e., parallel to the Z-axis). The views 820G and 830G (i.e., of the XZ plane and YZ plane, respectively) illustrate the different positions of the light beams B1 and B2 on the light beam sensors S1 and S2, respectively, and of the light beams B3 and B4 on the light beam sensors S3 and S4, respectively. In the view 840G, the measurement spots SP1-SP4 are illustrated as each having moved to the top center of the light beam sensors S1-S4, respectively.

In the example of FIG. 8H (e.g., in comparison to the example of FIG. 8A), the light beam source configuration LC' is illustrated as having been rotated clockwise in the XY plane and moved up in the Z direction (i.e., parallel to the Z-axis). The view 810H (i.e., of the XY plane) illustrates the clockwise rotation and the different positions of the light beams B1-B4 on the light beam sensors S1-S4. The views 820H and 830H (i.e., of the XZ plane and YZ plane, respectively) illustrate the different positions of the light beams B1 and B2 on the light beam sensors S1 and S2, respectively, and of the light beams B3 and B4 on the light beam sensors S3 and S4, respectively. In the view 840H, the measurement spots SP1-SP4 are illustrated as each having moved to the top right corner the light beam sensors S1-S4, respectively.

As described above, the light beam sensors S1-S4 may output measurement signals that indicate the positions of each of the measurement spots SP1-SP4 on the respective light beam sensors S1-S4. Given the known geometric relationships between the light beams B1-B4 and the light beam source configuration LC' (e.g., including the known angular orientations of the light beams B1-B4 as directed by and in relation to the light beam source configuration LC' and in relation to each other), the positions of the measurement spots SP1-SP4 on the light beam sensors S1-S4 indicate the position and orientation of the light beam source configuration LC' (e.g., as corresponding to the orientations in the examples of FIGS. 8A-8H). The measurement signals from the light beam sensors S1-S4 may be processed (e.g., by a processing portion 190), for which the processing may determine (e.g., at least in part utilizing the known geometric relationships, etc.) the position and orientation of the light beam source configuration LC' and/or an end tool ETL to which the light beam source configuration LC' is coupled (e.g., see FIG. 1), etc.

With respect to the measurement signals from the light beam sensors S1-S4 indicating the position and orientation of the light beam source configuration LC', it will be appreciated that the simplified examples of FIGS. 8A-8H are all with respect to the light beams B1-B4 each being directed to the respective light beam sensor S1-S4. More specifically, in each example, the light beam B1 is directed to the light beam sensor S1, the light beam B2 is directed to the light beam sensor S2, the light beam B3 is directed to the light beam sensor S3 and the light beam B4 is directed to the light beam sensor S4. In these examples, it will be appreciated that if the light beam source configuration LC' were rotated in the XY plane by 90 degrees, 180 degrees or 270 degrees, that similar measurement spots may be produced in similar locations on the light beam sensors S1-S4, for which it may be desirable to be able to disambiguate relative to (e.g., distinguish between) such possibilities.

For example, with respect to the orientation illustrated in FIG. 8A, and with the light beams B1-B4 each being directed to the respective light beam sensor S1-S4, it will be appreciated that the measurement signals indicating the that measurement spots SP1-SP4 are each in the centers of the respective light beam sensors S1-S4, respectively, uniquely indicate that the light beam source configuration LC' is in the position and orientation illustrated in the views 810A-830A of FIG. 8A (e.g., corresponding to a "null position" in the given example). However, with respect to the top view 810A, if the configuration were rotated clockwise by 90 degrees in the XY plane (e.g., for which another example of 90 degree rotation will be described in more detail below with respect to FIG. 9C), measurement spots SP would similarly be produced in the centers of the light beam sensors S1-S4. More specifically, the light beam B1 would produce a measurement spot SP1 at the center of the light beam sensor S4, the light beam B2 would produce a measurement spot SP2 at the center of the light beam sensor S3, the light beam B3 would produce a measurement spot SP3 at the center of the light beam sensor S1, and the light beam B4 would produce a measurement spot SP4 at the center of the light beam sensor S2. It will be appreciated that similar measurement spots at the centers of the light beam sensors S1-S4 as produced by different respective measurement beams may occur for similar clockwise rotations of the configuration in the XY plane of 180 degrees and 270 degrees, with respect to the initial orientation as illustrated in the top view 810A.

In order to disambiguate between the sets of measurement signals that would result from such orientations (e.g., which might otherwise appear relatively identical), it may be desirable for the system to be configured to determine (e.g., at least approximately) which light beams are generally directed toward which light beam sensors. As one approach for addressing such issues, position information from the movement system 110 may be utilized for the disambiguation. For example, in relation to the measurement system 110 as described above with respect to FIGS. 1 and 2, the position information determined from the positions sensors SEN1-SEN5 (e.g., as received by the movement system position and orientation processing portion 147), may be utilized to determine a coarse position and orientation of the end tool ETL and/or of the light beam source configuration LC (e.g., with a movement system accuracy). While the movement system accuracy may be lower than that desired for certain applications, it may be useful for the disambiguation (e.g., such as described in relation to the above examples). More specifically, the movement system accuracy may be able to provide coarse position information (e.g., indicating the coarse position and orientation of the end tool ETL and/or of the light beam source configuration LC), which may be utilized to determine which light beams are generally directed toward which light beam sensors.

Returning to the above examples, in an instance with the configuration of FIG. 8A where the measurement signals from the light beam sensors S1-S4 indicate that the measurement spots are all in the centers of the light beam sensors, the position and orientation information from the movement system may be utilized to disambiguate the possibilities for the orientation of the light beam source configuration LC' (e.g., between being a 0 degree rotation as illustrated in FIG. 8A, or a 90 degree rotation, or a 180 degree rotation, or a 270 degree rotation). For example, the position and orientation information from the movement system 110 may be utilized to determine whether the measurement spot that is at the center of the light beam sensor S1 is produced by the light beam B1, B2, B3 or B4. As noted above, while the measurement system accuracy may be relatively low, it may effectively be utilized by the metrology system for disambiguating possibilities such as those described above (in accordance with the coarse position information provided by the movement system), and for which the metrology system may then effectively provide higher accuracy measurements in accordance with the processes such as those described herein.

In various implementations, a general characterization of the relationship between the measurement signals of the movement system 110 and the measurement signals of the metrology system 150 may be described as follows. The position and orientation information (e.g., including measurements) determined from one or more of the position sensors SEN1-SEN5 of the movement system 110 (i.e., with the movement system accuracy) may be characterized as providing relatively coarse scale information (e.g., including coarse scale measurements of position and orientation, etc.). The position and orientation information (e.g., including measurements) determined from the metrology system 150 (e.g., as based on measurement signals from the light beam sensors) may be characterized as providing relatively fine scale information (e.g., including fine scale measurements of position and orientation, etc.). In various implementations, the measurements of the two systems may be combined to provide high accuracy measurements over a relatively large non-ambiguity range (e.g., such as micron level accuracy over a cubed meter movement volume).

As some specific example values, in one example implementation the movement system may have a positioning accuracy/potential position error of approximately 100 microns (e.g., with a non-ambiguity range provided over a 1 meter cubed movement/measurement volume as a coarse scale range). In this example, the metrology system may be configured to be able to resolve a potential distance error of the coarse scale measurement, such as with a non-ambiguity range that is larger than the potential distance error (e.g., a non-ambiguity range larger than 100 microns in this example, and with micron level accuracy, as a fine scale range). In accordance with such example values, the measurements (e.g., position and orientation information) of the two systems may be combined, to provide high accuracy measurements (e.g., with the micron level accuracy over the 1 meter cubed movement volume).

In regard to a metrology system such as that disclosed herein, such principles may also be generally described in terms of identifying/disambiguating which light beams of a light beam source configuration are directed to which light beam sensors (e.g., for a given measurement spot on a light beam sensor). In relation to the above example values, the positioning accuracy/potential position error of approximately 100 microns of the movement system (e.g., with a non-ambiguity range provided over a 1 meter cubed movement/measurement volume as a coarse scale range), may be sufficient for identifying/determining/disambiguating which light beams are directed to which light beam sensors. The non-ambiguity range of the metrology system (e.g., which is larger than 100 microns in the above example, and with micron level accuracy, as a fine scale range), may correspond to a range over which different positions and orientations of the light beam source configuration can be unambiguously determined (e.g., in accordance with measurement spots moving across or otherwise being in different respective positions on the light beam sensors, such as illustrated in part by the simplified examples of FIGS. 8A-8H).

As an alternative and/or in addition to the above noted implementations (e.g., in which position information from a movement system is utilized for disambiguation), the light beams may also or alternatively have certain characteristics which may be utilized for disambiguation (e.g., which enable determinations of which light beams are directed toward which light beam sensors). For example, the light beams may be arranged in a pattern (e.g., with unique portions). Some simplified examples of implementations with light beams arranged in a pattern are described in more detail below with respect to FIGS. 9A-9C and 10. In various implementations, the light beams may also or alternatively have different wavelengths (e.g., colors), timings, modulation, structures, and/or other characteristics that may be sensed/identified and utilized to determine which light beams are directed to which light beam sensors (e.g., for which the light beam sensors may also have certain corresponding differentiation capabilities, such as including different color detectors, etc.). In various implementations, one or more of the characteristics (e.g., timing, modulation, etc.) of the light beams may be controlled by a light beam source configuration control portion 192 (e.g., see FIG. 2), which may provide associated signals (e.g., timing signals, etc.) to a sensor configuration control and processing portion 180 and/or a metrology system position and orientation processing portion 190 (e.g., to be utilized as part of the processing for receiving measurement signals from the light beam sensors and utilizing the measurement signals for determining which light beams are directed toward which light beam sensors).

FIGS. 9A-9C are diagrams illustrating twelve example light beams B of a light beam source configuration LC" and corresponding measurement spots SP on four sensors S1-S4 of a sensor configuration 160" for different positions and orientations of the light beam source configuration LC". More specifically, in various implementations the light beam source configuration LC" provides and directs light beams B1, B2A-B2C, B3A-B3C and B4A-B4E to form corresponding measurement spots SP1, SP2A-SP2C, SP3A-SP3C and SP4A-SP4E on the light beam sensors S1-S4. It will be appreciated that in the examples of FIGS. 9A-9C, the light beams are arranged in a pattern (e.g., which in the orientation of FIG. 9A results in the single light beam B1 directed toward the light beam sensor S1, the three light beams B2A-B2C directed toward the light beam sensor S2, the three light beams B3A-B3C directed toward the light beam sensor S3, and the five light beams B4A-B4E directed toward the light beam sensor S4). It is noted that such patterns may include different spacings and orientations (e.g., angular spacings and orientations) between the light beams and/or other characteristics that may enable a portion of the pattern as directed to a light beam sensor or group of light beam sensors to be uniquely identified (e.g., for use in determining/disambiguating the orientation and/or position of the light beam sensor configuration, etc.)

In the example of FIG. 9A (with certain similarities to the orientation illustrated in FIG. 8A), the light beam source configuration LC", and the corresponding light beams B1, B2A-B2C, B3A-B3C and B4A-B4E, are illustrated as being in a designated "null" position (e.g., including a corresponding "null" orientation). More specifically, the light beam B1 and the central light beam B2B are each parallel to the X-axis direction, and are each directed to the centers of the light beam sensors S1 and S2, respectively. Similarly, the central light beams B3B and B4C are each parallel to the Y-axis direction, and are each directed to the centers of the light beam sensors S3 and S4, respectively.

In the orientation illustrated in FIG. 9A, the light beams B1, B2A-B2C, B3A-B3C and B4A-B4E produce corresponding measurement spots SP1, SP2A-SP2C, SP3A-SP3C and SP4A-SP4E on the light beam sensors S1-S4, respectively. As illustrated in the view 940A, the measurement spots SP1, SP2B, SP3B and SP4C are all in the centers of the light beam sensors S1, S2, S3 and S4, respectively. These measurement spot positions are noted to be similar to the measurement spot positions illustrated in FIG. 8A. However, unlike FIG. 8A where only single measurement spots are produced on each light beam sensor, in FIG. 9A, different numbers and/or arrangements of measurement spots are formed on different light beam sensors, in accordance with the pattern of light beams that are provided and directed by the light beam source configuration LC".

For example, while the light beam B1 produces only the single measurement spot SP1 at the center of the light beam sensor S1, the light beams B2A-B2C and B3A-B3C each produce a row of three measurement spots SP2A-SP2C and SP3A-SP3C across the middles of the light beam sensors S2 and S3, respectively. In addition, the light beams B4A-B4E produce a row of five measurement spots SP4A-SP4E across the middle of the light beam sensor S4. It will be appreciated that such characteristics may enable a determination of which light beams are directed to which light beam sensors (e.g., for enabling disambiguation in regard to the issues such as those described above), and for which additional position information (e.g., from a movement system) may not be required (e.g., although in some implementations may also be utilized in addition to such patterns or other information).

The light beam sensors S1-S4 may output measurement signals that indicate that the measurement spots SP1, SP2A-SP2C, SP3A-SP3C and SP4A-SP4E are in the indicated positions on the light beam sensors S1-S4. Given the known geometric relationships between the light beams B1, B2A-B2C, B3A-B3C and B4A-B4E and the light beam source configuration LC", the measurement signals from the light beam sensors S1-S4 indicate the position and orientation of the light beam source configuration LC". The measurement signals may be processed (e.g., by a processing portion 190), for which the processing may determine the position and orientation of the light beam source configuration LC" and/or an end tool ETL to which the light beam source configuration LC" is coupled (e.g., see FIG. 1), etc.

In the example of FIG. 9B (e.g., in comparison to the example of FIG. 9A), the light beam source configuration LC" is illustrated as having been rotated clockwise in the XY plane and moved up in the Z direction (i.e., parallel to the Z-axis, with certain similarities to the example of FIG. 8H). The view 910B (i.e., of the XY plane) illustrates the clockwise rotation and the top view of the different positions of the light beams B1, B2A-B2B, B3A-B3B and B4A-B4C on the light beam sensors S1-S4. It is noted that the light beams B2C, B3C and B4D-B4E are no longer directed to the respective light beam sensors, and are instead directed to spacings between the light beam sensors of the sensor configuration (e.g., such as may typically occur for some, or many, light beams in a relatively evenly distributed light beam pattern as directed towards a relatively limited number of light beam sensors which may have limited sizes and be at relatively large distances from the light beam source configuration, etc.). The cross section views 920B and 930B (i.e., at the cross sectional XZ plane and YZ plane, respectively) illustrate the different positions of the light beams B1 and B2A on the light beam sensors S1 and S2, respectively, and of the light beams B3A and B4A on the light beam sensors S3 and S4, respectively.

In the view 940B, the measurement spots SP1, SP2A-SP2B, SP3A-SP3B and SP4A-SP4C are illustrated as each having moved to the top and shifted to the right on the light beam sensors S1-S4, respectively. It is also noted that in the view 940B, there are no longer measurement spots SP2C, SP3C and SP4D-SP4E formed on the light beam sensors S2-S4 (i.e., due to the corresponding light beams B2C, B3C and B4D-B4E being directed to spaces between the light beam sensors). This example indicates in part why it may be desirable to have a sufficient number and/or relatively even distribution of light beams emanating in directions from a light beam source configuration. More specifically, given the sizes and possible distances of the light beam sensors from the light beam source configuration (e.g., during measurement operations) for a given implementation, it may generally be desirable for the light beam source configuration to provide a sufficient number and density of light beams in directions surrounding the light beam source configuration. Such factors for the light beam source configuration may help ensure that at least some, or all, of the light beam sensors of the sensor configuration have at least some light beams directed to them (e.g., for all possible orientations of the light beam source configuration during measurement operations) for producing corresponding measurement spots and corresponding measurement signals.

In the example of FIG. 9C (e.g., in comparison to the example of FIG. 9A), the light beam source configuration LC" is illustrated as having been rotated clockwise in the XY plane by a full 90 degrees. The view 910C (i.e., of the XY plane) illustrates the clockwise 90 degree rotation and the top view of the different positions of the light beams B1, B2A-B2C, B3A-B3C and B4A-B4E. Due to the 90 degree rotation, the light beam B1 is illustrated as being directed to the light beam sensor S4 (e.g., rather than the light beam sensor S1 as in the orientation of FIG. 8A). The light beams B2A-B2C are illustrated as being directed to the light beam sensor S3 (e.g., rather than the light beam sensor S2 as in the orientation of FIG. 8A). The light beams B3A-B3C are illustrated as being directed to the light beam sensor S1 (e.g., rather than the light beam sensor S3 as in the orientation of FIG. 8A). The light beams B4A-B4E are illustrated as being directed to the light beam sensor S2 (e.g., rather than the light beam sensor S4 as in the orientation of FIG. 8A). The light beam B1 and the central light beam B2B are each parallel to the Y-axis direction, and are each directed to the centers of the light beam sensors S4 and S3, respectively. Similarly, the central light beams B3B and B4C are each parallel to the X-axis direction, and are each directed to the centers of the light beam sensors S1 and S2, respectively.

In the orientation illustrated in FIG. 9C, the light beams B1, B2A-B2C, B3A-B3C and B4A-B4E produce corresponding measurement spots SP1, SP2A-SP2C, SP3A-SP3C and SP4A-SP4E on the light beam sensors S4, S3, S1 and S2, respectively. As illustrated in the view 940C, the measurement spots SP1, SP2B, SP3B and SP4C are all in the centers of the light beam sensors S4, S3, S1 and S2, respectively. As noted above, unlike FIGS. 8A-8H where only single measurement spots are produced on each light beam sensor, in FIG. 9C, different numbers of measurement spots are formed on different light beam sensors, in accordance with the pattern of light beams that are provided and directed by the light beam source configuration LC".

For example, while the light beam B1 produces only the single measurement spot SP1 at the center of the light beam sensor S4, the light beams B2A-B2C and B3A-B3C each produce a row of three measurement spots SP2A-SP2C and SP3A-SP3C across the middles of the light beam sensors S3 and S1, respectively. In addition, the light beams B4A-B4E produce a row of five measurement spots SP4A-SP4E across the middle of the light beam sensor S2. It will be appreciated that such characteristics may enable a determination of which light beams are directed to which light beam sensors (e.g., for enabling disambiguation in regard to the issues such as those described above).

For example, the measurement signal from the light beam sensor S4 indicates the position of the single measurement spot SP1 at the center of the light beam sensor S4, as uniquely corresponding to the light beam B1 (e.g., as compared to the orientation of FIG. 9A where the measurement signal from the light beam sensor S1 uniquely indicated the light beam B1 as directed to the light beam sensor S1). The measurement signal(s) from the light beam sensor S4 indicates the positions of the measurement spots SP4A-SP4E in the row at the middle of the light beam sensor S4, as uniquely corresponding to the light beams B4A-B4E (e.g., as compared to the orientation of FIG. 9A where the measurement signal(s) from the light beam sensor S4 uniquely indicated the light beams B4A-B4E as directed to the light beam sensor S4). In accordance with the pattern of light beams from the light beam source configuration LC" having unique or otherwise differentiated pattern portions, corresponding unique pattern portion measurement spots may be formed on the respective light beam sensors that the pattern portions are directed to. Such configurations may enable the measurement signals from the light beam sensors to be utilized to determine which light beams are directed to which light beam sensors (e.g., for disambiguation and/or otherwise determining a position and orientation of the light beam source configuration LC" in relation to the light beam sensors S1-S4, etc.)

FIG. 10 is a diagram illustrating eighteen example light beams B of a light beam source configuration LC''' and corresponding measurement spots SP on four sensors S1-S4 of a sensor configuration 160'''. More specifically, in various implementations the light beam source configuration LC''' provides and directs light beams B1, B2A-B2E, B3A-B3E and B4A-B4G to form (in certain positions and orientations) corresponding measurement spots SP1, SP2A-SP2E, SP3A-SP3E and SP4A-SP4G on the light beam sensors S1-S4. It will be appreciated that in the example of FIG. 10, the light beams are arranged in a pattern (e.g., which in the orientation of FIG. 10 results in the single light beam B1 directed toward the light beam sensor S1, the five light beams B2A-B2E directed toward the light beam sensor S2, the five light beams B3A-B3E directed toward the light beam sensor S3, and the seven light beams B4A-B4G directed toward the light beam sensor S4). It is noted that such patterns may include different spacings and orientations (e.g., angular spacings and orientations) between the light beams and relative to the light beam source configuration LC''' and/or other characteristics that may enable a portion of the pattern as directed to a light beam sensor or group of light beam sensors to be uniquely identified (e.g., for use in determining/disambiguating the orientation and/or position of the light beam sensor configuration, etc.)

In the example of FIG. 10 (with certain similarities to the orientations illustrated in FIGS. 8A and 9A), the light beam source configuration LC''', and the corresponding light beams B1, B2A-B2E, B3A-B3E and B4A-B4G, are illustrated as being in a designated "null" position (e.g., including a corresponding "null" orientation). More specifically, the light beam B1 and the central light beam B2B are each parallel to the X-axis direction, and are each directed to the centers of the light beam sensors S1 and S2, respectively. Similarly, the central light beams B3C and B4C are each parallel to the Y-axis direction, and are each directed to the centers of the light beam sensors S3 and S4, respectively.

In the orientation illustrated in FIG. 10, the light beams B1, B2A-B2E, B3A-B3E and B4A-B4G produce corresponding measurement spots SP1, SP2A-SP2E, SP3A-SP3E and SP4A-SP4G on the light beam sensors S1-S4, respectively. As illustrated in the view 1040, the measurement spots SP1, SP2B, SP3C and SP4C are all in the centers of the light beam sensors S1, S2, S3 and S4, respectively. These center measurement spot positions are noted to be similar to the center measurement spot positions illustrated in FIG. 9A.

However, unlike FIG. 9A where any surrounding measurement spots are only produced by light beams in the same XY plane, in FIG. 10, different numbers and/or arrangements of surrounding measurement spots are also produced by other light beams, some of which are not in the same XY plane.

For example, as further illustrated in the view 1040, while the light beam B1 produces only the single measurement spot SP1 at the center of the light beam sensor S1, the light beams B2A-B2E produce a pattern (corresponding to a portion of the overall pattern of the light beam source configuration LC''') of five measurement spots SP2A-SP2E. More specifically, the pattern of the five measurement spots SP2A-SP2E includes the measurement spots SP2A-SP2C in a row in the middle of the light beam sensor S2, and the measurement spots SP2D, SP2B and SP2E in a column in the middle of the light beam sensor S2.

For the light beam sensor S3, the light beams B3A-B3E produce a pattern (corresponding to a portion of the overall pattern of the light beam source configuration LC''') of five measurement spots SP3A-SP3E. More specifically, the pattern of the five measurement spots SP2A-SP2E includes the measurement spots SP2A-SP2E in a column in the middle of the light beam sensor S3. For the light beam sensor S4, the light beams B4A-B4G produce a pattern (corresponding to a portion of the overall pattern of the light beam source configuration LC''') of seven measurement spots SP4A-SP4G. More specifically, the pattern of the seven measurement spots SP4A-SP4G includes the measurement spots SP2A-SP2E in a row in the middle of the light beam sensor S4, and the measurement spots SP4F, SP4C and SP4G in a column in the middle of the light beam sensor S4.

In comparison to the configuration of FIGS. 9A-9C, it will be appreciated that the configuration of FIG. 10 provides light beams arranged in different planes and with further different angular orientations relative to each other and to the light beam source configuration LC'''. It will be appreciated that such characteristics may further enable a determination of which light beams are directed to which light beam sensors (e.g., for enabling disambiguation in regard to the issues such as those described above), including for rotations and/or movements in planes in addition to the XY plane (e.g., such as rotations and/or movements in the XZ and/or YZ planes, etc.) and for which additional position information (e.g., from a movement system) may not be required (e.g., although in some implementations may also be utilized in addition to such patterns or other information).

The light beam sensors S1-S4 may output measurement signals that indicate that the measurement spots SP1, SP2A-SP2E, SP3A-SP3E and SP4A-SP4G are in the indicated positions on the light beam sensors S1-S4. Given the known geometric relationships between the light beams B1, B2A-B2E, B3A-B3E and B4A-B4G and the light beam source configuration LC''', the measurement signals from the light beam sensors S1-S4 indicate the position and orientation of the light beam source configuration LC''' (e.g., as corresponding to the position and orientation of the example of FIG. 10). The measurement signals may be processed (e.g., by a processing portion 190), for which the processing may determine the position and orientation of the light beam source configuration LC''' and/or an end tool ETL to which the light beam source configuration LC''' is coupled (e.g., see FIG. 1), etc.

In further regard to any of the light beam patterns illustrated in FIGS. 9A-10, it will be appreciated that in some configurations a light beam pattern of a light beam source configuration may include repeating light beam pattern portions as directed to light beam sensors (or portions of light beam sensors), while also including unique or otherwise distinguishable portions utilized for disambiguation. In such implementations, the unique or otherwise distinguishable pattern portions may essentially serve as a type of coarse or absolute pattern "marker" or "code" that can be utilized for disambiguation.

Figure 11:
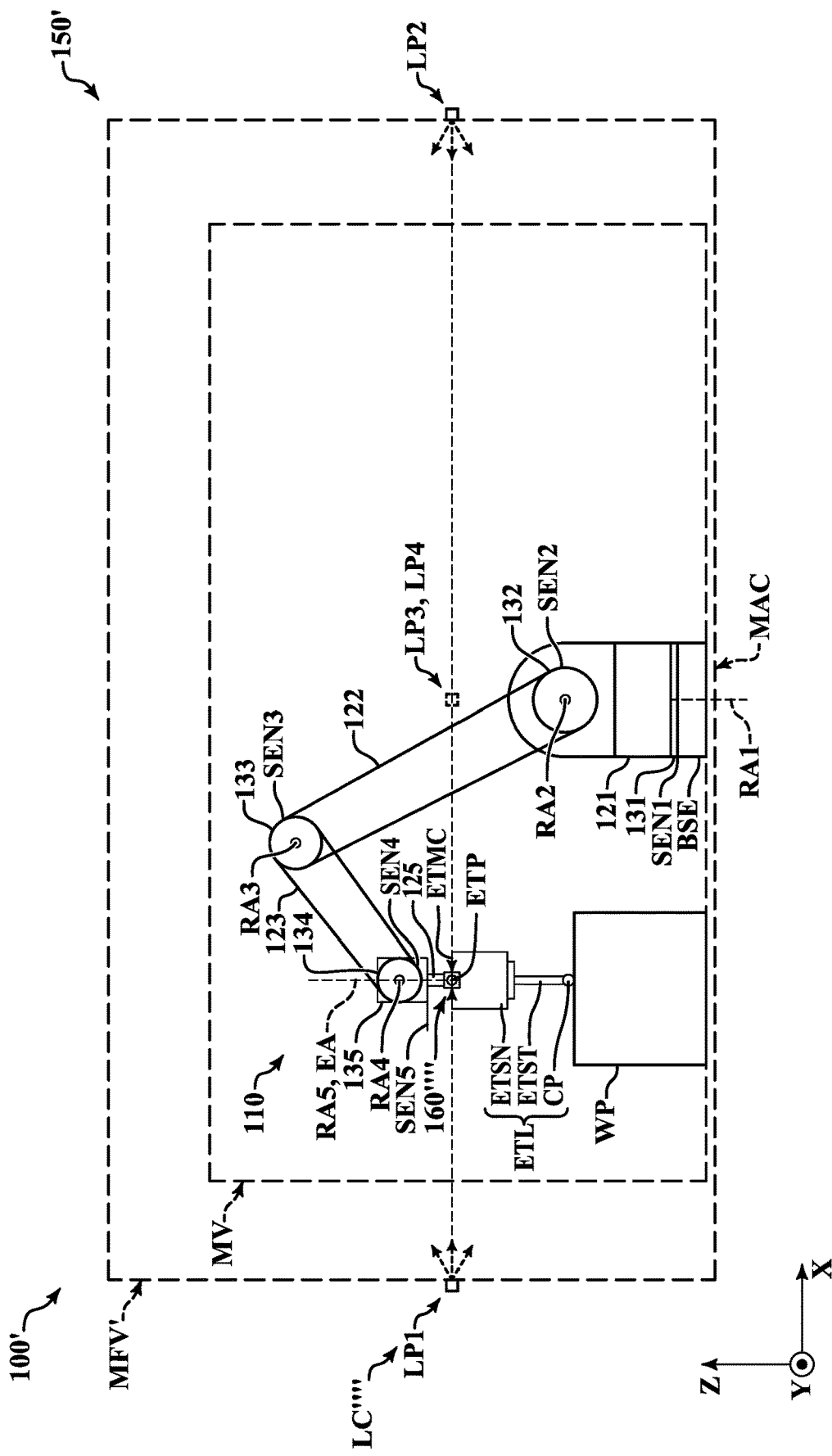
FIG. 11 is a block diagram of a second exemplary implementation of a movement and metrology system.
Figure 12:
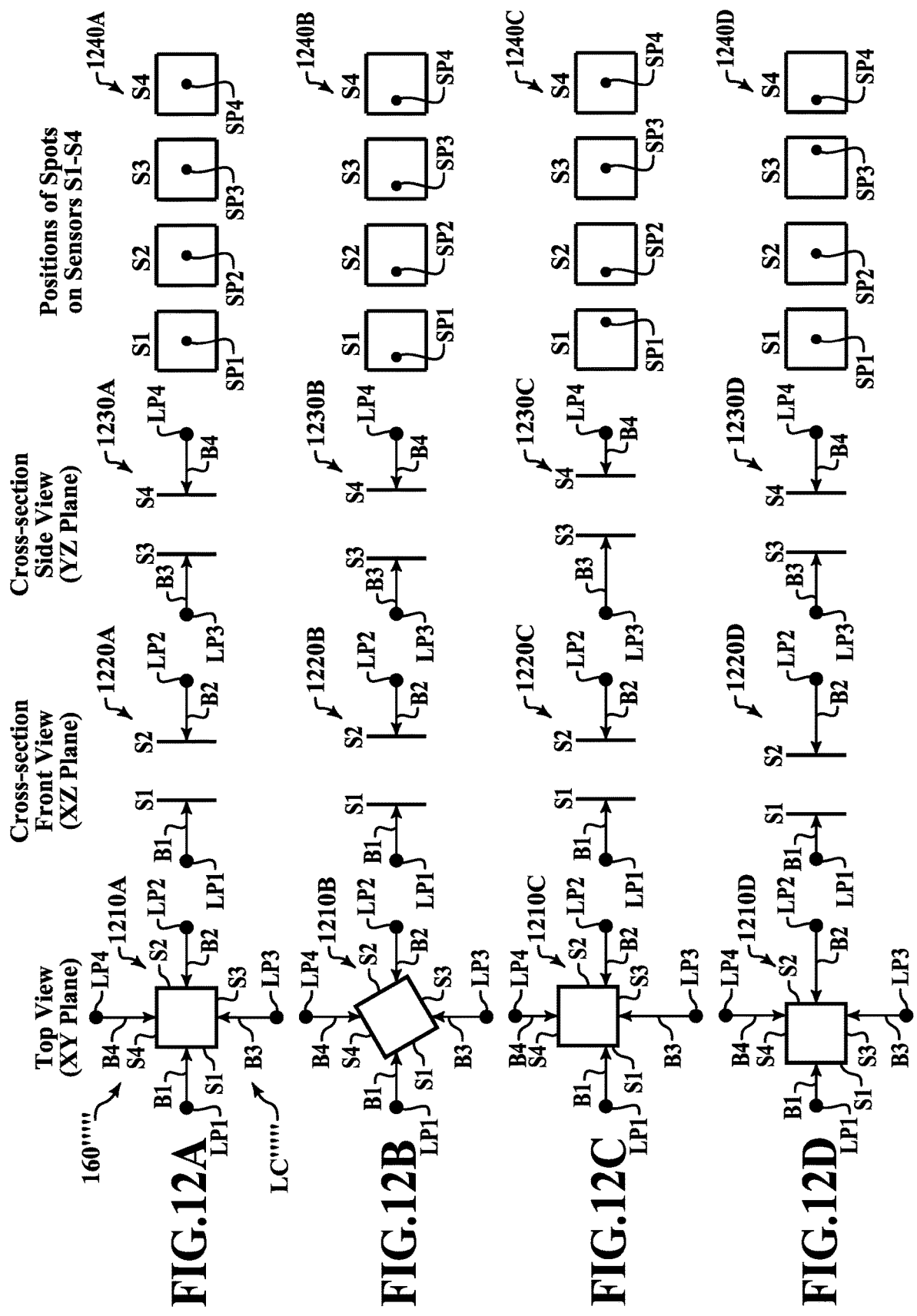
FIGS. 12A-12D are diagrams illustrating four example light beams of a light beam source configuration and corresponding measurement spots on four sensors of a sensor configuration for different positions and orientations of the sensor configuration.

FIG. 11 is a block diagram of a second exemplary implementation of a movement and metrology system 100' including a movement system 110 and a metrology system 150'. The movement system 110 is generally the same as that of FIG. 1, and will be understood with respect to the above description of FIG. 1. As noted above, the movement system 110 (e.g., an articulated robot) includes a movable configuration MAC (e.g., a movable arm configuration) and a motion control and processing system 140 (e.g., see FIG. 2). The metrology system 150' includes a sensor configuration 160'''', a light beam source configuration LC'''', and a metrology system position and orientation processing portion 190 (e.g., see FIG. 2). As noted above, FIG. 2 is a block diagram illustrating control and processing portions 200, which may be utilized as part of the system of FIG. 11, and for which certain functions in relation to FIG. 11 will be described in more detail below. In the configuration of FIG. 11, the light beam source configuration LC'''' is illustrated as including light beam source portions LP1 and LP2 at the sides of a metrology frame volume MFV' and as directing arrowed light beams in different directions, including toward the sensor configuration 160'''' (e.g., which includes light beam sensors as will be described in more detail below). The sensor configuration 160'''' is illustrated as being coupled to the end tool ETL. As will be described in more detail below, the metrology system 150' may be utilized for tracking a position and orientation (e.g., of the end tool ETL as moved by the movement system 110).

It will be appreciated that certain numbered components designated with a certain number of primes (e.g. 1XX' or 1XX'''', etc.) or other similar or identical reference numbers of FIG. 11 may correspond to and/or have similar operations as certain similar or identical numbered counterpart components 1XX of FIG. 1 and other figures herein, and may be understood by analogy thereto, except as otherwise described below. This numbering scheme to indicate elements having analogous design and/or function (i.e., unless otherwise illustrated and/or described) is also applied elsewhere herein (e.g., with respect to FIGS. 12A-12D and with respect to other figures described above).

In various implementations, the metrology system 150' may be included with or otherwise added to a movement system 110 (e.g., as part of a retrofit configuration for being added to an existing movement system 110, etc.). In general, the metrology system 150' may be utilized to provide a determination of the position and orientation of the end tool ETL (e.g., with an improved level of accuracy relative to the accuracy of the movement system 110). More specifically, as will be described in more detail below, the metrology system 150' may be utilized to determine a relative position that is indicative of the metrology position coordinates of the end tool position ETP and an orientation of the end tool ETL, with an accuracy level that is better than the movement system accuracy.

In various implementations, the light beam source configuration LC'''' includes a plurality of light beam source portions LP (e.g., light beam source portions LP1-LP4), as will be described in more detail below with respect to FIGS. 12A-12D. In FIG. 11, the light beam source portions LP1 and LP2 are shown on the far left and right in the illustrated cross-sectional view, respectively, and the general positions of the light beam source portions LP3 and LP4 (e.g., which would be located out of and into the page, respectively) are indicated by a dotted line representation. In general, certain potential positions of the light beam source portions LP1-LP4 will be understood with analogy to the positions of the light beam sensors S1-S4 in the configurations of FIGS. 1, 4 and 8A-10.

The light beam source portions LP1-LP4 are located at fixed positions (e.g., as may each be located on a frame, wall or other structure, etc.) which at least in part define a metrology frame volume MFV'. The metrology frame volume MFV' is configured to be located around at least part of the movement volume MV (e.g., in which at least part of the end tool ETL is moved by the movement system 110). The light beam source configuration LC"" is configured to be operated (e.g., by a light beam source configuration control portion 192) to direct light beams to the light beam sensors of the sensor configuration 160"" to indicate and enable a position and orientation of the sensor configuration 160"" to be determined. In various implementations, the sensor configuration 160"" of the metrology system 150' includes a plurality of light beam sensors (e.g., light beam sensors S1-S4, such as may be arranged in a square configuration, as will be described in more detail below with respect to FIGS. 12A-12D). In certain implementations, the light beam sensors of the sensor configuration 160"" may be in a configuration which surrounds at least part of the end tool ETL and/or the end tool mounting configuration ETMC.

The sensor configuration 160"" is configured to be coupled to at least one of the end tool ETL or the end tool mounting configuration ETMC. It will be appreciated that when the end tool ETL is coupled to the end tool mounting configuration ETMC, the sensor configuration 160"" is then coupled to both the end tool ETL and the end tool mounting configuration ETMC. The position and orientation of the sensor configuration 160"" are indicative of the position and orientation of the end tool ETL. As will be described in more detail below with respect to FIGS. 12A-12D, the light beams that are directed to the light beam sensors (e.g., light beam sensors S1-S4) of the sensor configuration 160"" are configured to produce measurement spots SP in positions on the light beam sensors that cause the light beam sensors to produce corresponding measurement signals. The metrology system position and orientation processing portion 190 is configured to process the measurement signals from the light beam sensors of the sensor configuration 160"", wherein the measurement signals from the light beam sensors indicate the position and orientation of the sensor configuration 160"", and correspondingly of the end tool ETL.

In various implementations, the movement volume MV consists of a volume in which at least a portion of at least one of the end tool ETL and/or the sensor configuration 160"" may be moved. In the example of FIG. 11, the movement volume MV is illustrated as including a volume in which the contact point CP of the end tool ETL may be moved when inspecting a workpiece. As one alternative example, a movement volume may alternatively include a volume in which the sensor configuration 160"" may move when the end tool ETL is moved for inspecting a workpiece. In various implementations, the movement system 110 is configured to move the movable configuration MAC so as to move at least a portion of an end tool ETL (e.g., including the contact point CP) that is mounted to the end tool mounting configuration ETMC along at least two dimensions (e.g., x and y dimensions) in the movement volume MV. In the example of FIG. 11, the portion of the end tool ETL (e.g., the contact point CP) is movable by the movement system 110 along three dimensions (e.g., x, y and z dimensions).

In various implementations, in relation to the control and processing portions of FIG. 2, the latch portion 181 and/or the metrology system position and orientation processing portion 190 and/or the light beam source configuration control portion 192 may be included as part of an external control system ECS (e.g., as part of an external computer, etc.). The light beam source configuration control portion 192 may provide power and/or control signals to the light beam source configuration LC"" including the light beam source portions LP1-LP4 and/or portions thereof (e.g., to one or more light beam sources of the light beam source portions LP1-LP4 of the light beam source configuration LC"", etc.). The latch portion 181 may be included as part of a sensor configuration control and processing portion 180 (e.g., which may provide power and/or receive measurement signals from and/or provide control signals to the light beam sensors of the sensor configuration 160"", and which may provide such signals and/or other signals to and from the metrology system position and orientation processing portion 190).

In various implementations, the latch portion 181 is configured to input at least one input signal that is related to the end tool position ETP and to determine the timing of a trigger signal based on the at least one input signal, and to output the trigger signal to at least one of the metrology system position and orientation processing portion 190 or the light beam sensors of the sensor configuration 160"". In various implementations, the metrology system position and orientation processing portion 190 and/or the sensor configuration 160"" are configured to determine current measurement signals from the light beam sensors (e.g., as corresponding to a current position and orientation of the sensor configuration 160"" and/or end tool ETL) in response to receiving the trigger signal. In various implementations, the metrology system position and orientation processing portion 190 is configured to process the measurement signals as corresponding to the timing of the trigger signal to determine a position and orientation of the sensor configuration 160"" and/or end tool ETL at the time of the trigger signal.

In various implementations, once a position and orientation of the sensor configuration 160"" is determined, the position and orientation of the end tool may correspondingly be determined (e.g., in accordance with known geometric relationships, relative positioning, offsets etc., between the sensor configuration 160"" and the end tool ETL). In various implementations, the sensor configuration 160"" may be directly attached to the end tool ETL (e.g., partially surrounding a portion of the end tool ETL), or attached at or very close to the end tool mounting configuration (e.g., such that there is minimal or no separation between the end tool ETL and the sensor configuration 160""). In the implementation of FIG. 11, the sensor configuration 160"" is illustrated as being at, or at least proximate to, the end tool position ETP (e.g., a designated reference position for the end tool ETL). Such configurations may reduce the complexity and/or otherwise improve the accuracy of a determination of the position and orientation of the end tool ETL as calculated in relation to a determined position and orientation of the sensor configuration 160"".

In various implementations, the determination of the position and orientation of the end tool ETL may further be utilized for determining certain additional position information (e.g., for determining the position of the contact point CP). As noted above, in various implementations, measurements of a workpiece surface may be determined by touching a contact point CP of an end tool ETL to a workpiece surface. In relation to such measurements, both the position and orientation of the end tool ETL may be determined, which may correspondingly indicate the position of the contact point CP. As described above with respect to FIGS. 1 and 2, in various implementations, different types of end tools ETL may provide different types of outputs (e.g., such as may be utilized with respect to the latch portion 181).

In various implementations, the metrology system 150' may be configured to determine the position and orientation of the sensor configuration 160"" and/or end tool ETL, based on the measurement signals from the light beam sensors of the sensor configuration 160"". It will be appreciated that such a system may have certain advantages over various alternative systems (e.g., such as a photogrammetry system, etc.), such as described above with respect to FIGS. 1 and 2. For example, in various implementations a system such as that disclosed herein may be smaller and/or less expensive and/or more accurate than certain alternative systems utilizing alternative technologies (e.g., including certain photogrammetry systems, etc.) as may alternatively be utilized for tracking movement system positions and orientations. The disclosed system also does not take up or obscure any part of the movement volume MV, such as alternative systems that may include a scale or fiducial on the ground or stage, or otherwise in the same area (e.g., in the movement volume MV) where workpieces may otherwise be worked on and/or inspected, etc.

In the metrology system 150' as disclosed herein, coherent light sources may typically be utilized. For example, the light sources for the light beam source portions LP of the light beam source configuration LC"" may be coherent light sources (e.g., laser light sources), for which the light beams may be coherent light beams (e.g., laser beams). Diffractive optical elements (e.g., as described above with respect to FIG. 3) may be utilized to produce many diffracted light beams (e.g., which can be dispersed in many directions emanating out from the light beam source portions LP and into the movement volume MV). In various implementations, the light beam source portions LP may include certain components analogous to those of the light beam source portion LP' of FIG. 3. For example, each of the light beam source portions LP may include at least a light source (e.g., analogous to light source LS1), and may further include components such as reflective elements, beamsplitters, diffractive optical elements and/or lenses. Utilizing such components, it will be appreciated that the light beam source portions may be configured to project light beams into the movement volume MV (e.g., as illustrated for the light beam source portions LP1 and LP2 of FIG. 11).

In various implementations, a relatively small fraction of the many diffracted or otherwise provided light beams may be directed to or otherwise received by the light beam sensors of the sensor configuration 160"" (e.g., to produce corresponding measurement spots SP on the light beam sensors). In various implementations, the light beam sensors may be two dimensional position sensitive sensors (e.g., lensless cameras, position sensitive detectors, optical position sensors that can measure a position of a light spot in two-dimensions on a sensor surface, etc.).

In various implementations, measurement signals from the light beam sensors (e.g., indicating two dimensional positions of measurement spots SP formed by the light beams, for which a centroid of each measurement spot may be calculated/determined in terms of XYZ coordinates) may be utilized in combination with the known characteristics of the sensor configuration 160"" and the light beam source configuration LC"" (e.g., including laser projection based on the known geometric relationships of the light beams including the relative three dimensional angles of each light beam and accounting for any offsets of each light beam at its source, etc.) to calculate/determine the position and orientation of the sensor configuration 160"" (e.g., as based on using nonlinear least squares and/or other processing/calculation techniques). Stated another way, the known vectors of the light beams may be fit to the known locations (e.g., in XYZ coordinates) that they intersect on the light beam sensors (e.g., in terms of the positions of the measurement spots SP) to determine the position and orientation of the sensor configuration 160"". In various implementations, the measurement spots SP on the light beam sensors may each be uniquely identified (e.g., in part by utilizing coarse position information determined from the movement system 110, and/or based on unique pattern information and/or other characteristics of the light beams, such as a pseudo-random pattern with unique or otherwise identifiable portions, etc.).

It will be appreciated that the combination of such features and characteristics of the metrology system 150' may result in higher accuracy position and orientation determinations than those provided by other systems (e.g., such as a photogrammetry system such as that described above). As some particular advantages, it is noted that the light beams as utilized in the metrology system 150' have corresponding orientation information that is lacking in photogrammetry and may be more sensitive to the orientation (e.g., of the sensor configuration 160"" and the end tool ETL). This can increase accuracy by a large amount. In addition, the measurement spots SP can be detected directly on the light beam sensors instead of imaged, thus avoiding certain potential aberration errors, etc.

FIGS. 12A-12D are diagrams illustrating four example light beams B1-B4 of light beam source portions LP1-LP4 of a light beam source configuration LC"" and corresponding measurement spots SP1-SP4 on four sensors S1-S4 of a sensor configuration 160"" for different positions and orientations of the sensor configuration 160"". In various implementations, the light beam source configuration LC"" may be similar to that of FIG. 11 (e.g., with the four light beam source portions LP1-LP4 at least partly defining a corresponding cubical metrology frame volume MFV). FIGS. 12A-12D illustrate respective top views 1210A-1210D, cross-section front views 1220A-1220D, cross-section side views 1230A-1230D, and positions of measurements spots views 1240A-1240D (i.e., in accordance with a front view of the sensor surface of each of the respective light beam sensors S1-S4).

In various implementations, the examples of FIGS. 12A-12D may also be illustrative of operations of sensor configurations with a greater number of light beam sensors, for which the following described examples may be illustrative of the operations of four out of the total number of light beam sensors in the given configurations. The examples of FIGS. 12A-12D may also be illustrative of operations of light beam source configurations with a greater number of light beam source portions and/or light beams (e.g., 10's, 100's, or 1000's, etc., of light beams, such as may in some instances be directed in relatively evenly distributed three dimensional directions as directed from the light beam source portions into the movement volume MV). In regard to such implementations, the following described examples may be illustrative of the operations of four (e.g., the four most central light beams and/or the four light beams specifically oriented along the X and Y axis directions toward a central position of a movement volume MV, etc.) out of the total number of light beams in the given configurations. It will also be appreciated with respect to the examples of FIGS. 12A-12D, that the relative sizes of the light beam sensors S1-S4 appear exaggerated, and the relative distances between and to the light beam source portions appear reduced, for purposes of simplifying the illustrated examples.

In the example of FIG. 12A, the sensor configuration 160'''', and the corresponding sensors S1-S4, are illustrated as being in a designated "null" position (e.g., including a corresponding "null" orientation). More specifically, the light beam sensors S1 and S2 (i.e., the sensor surfaces of the light beam sensors S1 and S2) are each orthogonal to the X-axis direction, and for which the light beams B1 and B2 are each directed to the centers of the light beam sensors S1 and S2, respectively. Similarly, the light beam sensors S3 and S4 are each orthogonal to the Y-axis direction, and for which the light beams B3 and B4 are each directed to the centers of the light beam sensors S3 and S4, respectively. The light beams B1-B4 produce corresponding measurement spots SP1-SP4 in the centers of each of the light beam sensors S1-S4, respectively. In various implementations, the light beam sensors S1-S4 may be two dimensional position sensitive sensors (e.g., optical position sensors that can measure a position of a measurement spot, such as formed by a light beam, in two-dimensions on a sensor surface).

The light beam sensors S1-S4 may output measurement signals that indicate that the measurement spots SP1-SP4 are in the centers of the light beam sensors S1-S4. Given the known geometric relationships between the light beam sensors S1-S4 of the sensor configuration 160'''', the light beams B1-B4 and the light beam source configuration LC'''', the measurement signals from the light beam sensors S1-S4 indicate the position and orientation of the sensor configuration 160'''' (e.g., as corresponding to the position and orientation of the example of FIG. 12A). The measurement signals may be processed (e.g., by a processing portion 190), for which the processing may determine the position and orientation of the sensor configuration 160'''' and/or an end tool ETL to which the sensor configuration 160'''' is coupled (e.g., see FIG. 11), etc.

In the example of FIG. 12B (e.g., in comparison to the example of FIG. 12A), the sensor configuration 160'''' is illustrated as having been rotated counter-clockwise in an XY plane. The view 810B (i.e., of the XY plane) illustrates the counter-clockwise rotation and indicates the different positions of the light beam sensors S1-S4 in relation to the light beams B1-134. The view 840B illustrates the positions of the measurement spots SP1-SP4 on the light beam sensors S1-S4, as produced by the light beams B1-134, respectively. More specifically, the measurement spots SP1-SP4 are shown to each have moved toward the middle left of each of the light beam sensors S1-S4, respectively.

The example of FIG. 12B is noted to correspond at least to a change in orientation of the sensor configuration 160''''. In some implementations, the illustrated change may not otherwise correspond to a change in position (e.g., depending on where a reference point is designated for the sensor configuration 160'''', which changes in position are determined in relation to). In the examples of FIGS. 12A-12D, in various implementations a reference point for a sensor configuration may be designated as being at a geometric center, or other center, of the sensor configuration.

In the example of FIG. 12C (e.g., in comparison to the example of FIG. 12A), the sensor configuration 160'''' is illustrated as having moved in the XY plane toward the light beam source portion LP4. The view 1210C (i.e., of the XY plane) illustrates the different positions of the light beam sensors S1 and S2 in relation to the light beams B1 and B2. In the view 1240C, the measurement spots SP1 and SP2 are illustrated as having moved toward the middle right and middle left, respectively, of the light beam sensors S1 and S2, while the measurement spots SP3 and SP4 have remained in the centers of the light beam sensors S3 and S4, respectively.

In the example of FIG. 12D (e.g., in comparison to the example of FIG. 12A), the sensor configuration 160'''' is illustrated as having moved in the XY plane toward the light beam sensor S1. The view 1210D (i.e., of the XY plane) illustrates the different positions of the light beam sensors S3 and S4 in relation to the light beams B3 and B4. In the view 1240D, the measurement spots SP1 and SP2 have remained in the centers of the light beam sensors S1 and S2, respectively, while the measurement spots SP3 and SP4 are illustrated as having moved toward the middle right and middle left, respectively, of the light beam sensors S3 and S4.

As described above, the light beam sensors S1-S4 may output measurement signals that indicate the positions of each of the measurement spots SP1-SP4 on the respective light beam sensors S1-S4. Given the known geometric relationships between the light beam sensors S1-S4 of the sensor configuration 160'''', the light beams B1-B4 and the light beam source configuration LC'''' (e.g., including the known angular and spatial relationships of the light beam sensors S1-S4 of the sensor configuration 160'''', and the known angular orientations and spatial relationships of the light beams B1-B4 as directed by and in relation to the light beam source portions LP1-LP4 of the light beam source configuration LC'''' and in relation to each other), the positions of the measurement spots SP1-SP4 on the light beam sensors S1-S4 indicate the position and orientation of the sensor configuration 160'''' (e.g., as corresponding to the positions and orientations in the examples of FIGS. 12A-12D). The measurement signals from the light beam sensors S1-S4 may be processed (e.g., by a processing portion 190), for which the processing may determine (e.g., at least in part utilizing the known geometric relationships, etc.) the position and orientation of the sensor configuration 160'''' and/or an end tool ETL to which the sensor configuration 160'''' is coupled (e.g., see FIG. 11), etc.

As described above with respect to the examples of FIGS. 8A-10, in various implementations (e.g., for purposes of disambiguation, etc.), it may be desirable for the system to be configured to determine (e.g., at least approximately) which light beams are generally directed toward which light beam sensors. As noted above, as one approach for addressing such issues, position information from the movement system 110 may be utilized for the disambiguation. For example, in relation to the measurement system 110 as described above with respect to FIGS. 1, 2 and 11, the position information determined from the positions sensors SEN1-SEN5 (e.g., as received by the movement system position and orientation processing portion 147), may be utilized to determine a coarse position and orientation of the end tool ETL and/or of the sensor configuration 160'''' (e.g., with a movement system accuracy). While the movement system accuracy may be lower than that desired for certain applications, it may be useful for the disambiguation (e.g., such as described in relation to the above examples). More specifically, the movement system accuracy may be able to provide coarse position information (e.g., indicating the coarse position and orientation of the end tool ETL and/or of the sensor configuration 160''''), which may be utilized to determine which light beams are directed toward which light beam sensors, and for which the metrology system 150' may then effectively provide higher accuracy measurements in accordance with the processes such as those described herein.

In various implementations, a general characterization of the relationship between the measurement signals of the movement system 110 and the measurement signals of the metrology system 150' may be described as follows. The position and orientation information (e.g., including measurements) determined from one or more of the position sensors SEN1-SEN5 of the movement system 110 (i.e., with the movement system accuracy) may be characterized as providing relatively coarse scale information (e.g., including coarse scale measurements of position and orientation, etc.). The position and orientation information (e.g., including measurements) determined from the metrology system 150' (e.g., as based on measurement signals from the light beam sensors) may be characterized as providing relatively fine scale information (e.g., including fine scale measurements of position and orientation, etc.). In various implementations, the measurements of the two systems may be combined to provide high accuracy measurements over a relatively large non-ambiguity range (e.g., such as over a cubed meter movement volume).

As an alternative and/or in addition to the above noted implementations (e.g., in which position information from a movement system is utilized for disambiguation), the light beams may also or alternatively have certain characteristics which may be utilized for disambiguation (e.g., which enable determinations of which light beams are directed toward which light beam sensors). For example, the light beams may be arranged in a pattern (e.g., with unique portions). In various implementations, the light beams may also or alternatively have different wavelengths (e.g., colors), timings, modulation, structures, and/or other characteristics that may be sensed/identified and utilized to determine which light beams are directed to which light beam sensors (e.g., for which the light beam sensors may also have certain corresponding differentiation capabilities, such as including different color detectors, etc.). In various implementations, one or more of the characteristics (e.g., timing, modulation, etc.) of the light beams may be controlled by a light beam source configuration control portion 192 (e.g., see FIG. 2), which may provide associated signals (e.g., timing signals, etc.) to a sensor configuration control and processing portion 180 and/or a metrology system position and orientation processing portion 190 (e.g., to be utilized as part of the processing for receiving measurement signals from the light beam sensors and utilizing the measurement signals for determining which light beams are directed toward which light beam sensors).

Figure 13:
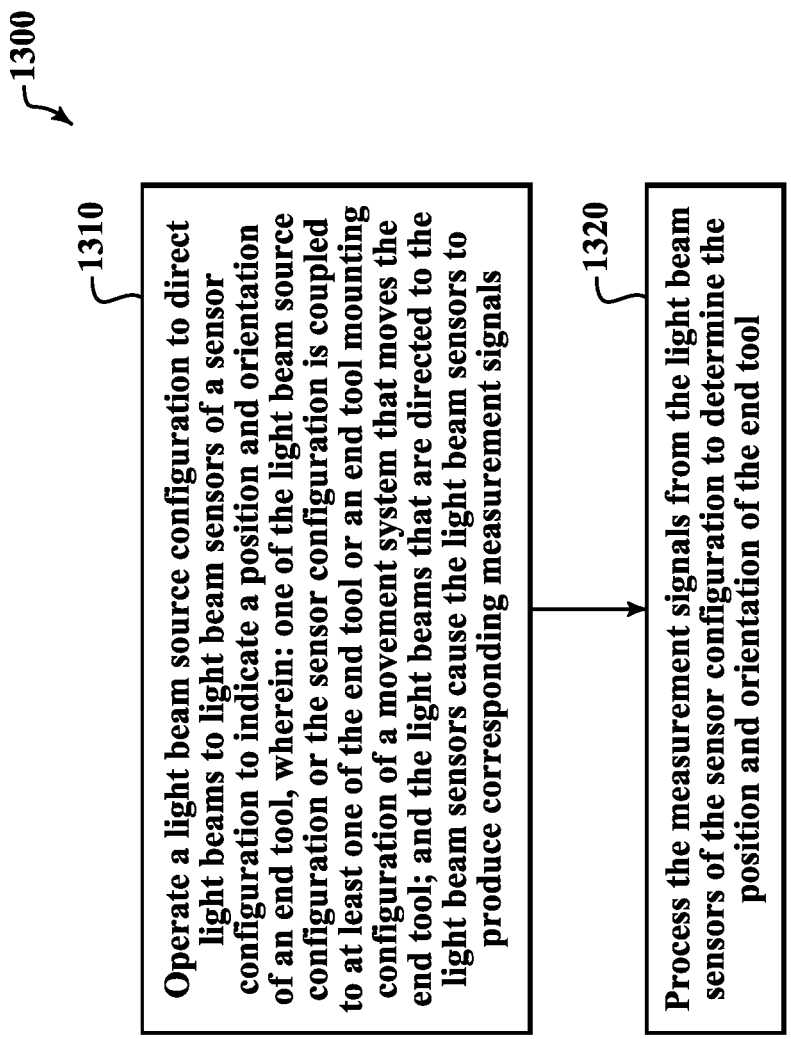
FIG. 13 is a flow diagram illustrating one exemplary implementation of a routine for operating a metrology system.

FIG. 13 is a flow diagram illustrating one exemplary implementation of a routine 1300 for operating a metrology system. At a block 1310, a light beam source configuration is operated to direct light beams to light beam sensors of a sensor configuration to indicate a position and orientation of an end tool. In various implementations, one of the light beam source configuration or the sensor configuration is coupled to at least one of the end tool or an end tool mounting configuration of a movement system that moves the end tool. The light beams that are directed to the light beam sensors cause the light beam sensors to produce corresponding measurement signals. At a block 1320, the measurement signals from the light beam sensors of the sensor configuration are processed to determine a position and orientation of the end tool.

The following describes various exemplary embodiments of the present disclosure with various features and elements annotated with reference numerals found in FIGS. 1-13. It should be understood that the reference numerals are added to indicate exemplary embodiments, and the features and elements are not limited to the particular embodiments illustrated in FIGS. 1-13.

According to one aspect, a metrology system (e.g., metrology system 150 of FIG. 1 or metrology system 150' of FIG. 11) is provided for use with a movement system 110 that moves an end tool ETL. The movement system 110 includes a movable configuration MAC and a motion control system 140. The movable configuration MAC comprises an end tool mounting configuration ETMC that an end tool ETL is configured to mount to. The motion control system 140 is configured to control an end tool position and orientation, based at least in part on controlling the movable configuration MAC so as to move at least a portion of an end tool ETL that is mounted to the end tool mounting configuration ETMC within a movement volume MV.

In a first implementation (e.g., as illustrated in FIG. 1), the metrology system 150 includes a sensor configuration 160, a light beam source configuration LC and a processing portion 190. The sensor configuration 160 comprises a plurality of light beam sensors S1-S4 (e.g., located at fixed positions which at least in part define a metrology frame volume MFV, wherein the metrology frame volume MFV is configured to be located around at least part of the movement volume MV). The light beam source configuration LC is configured to direct light beams to the light beam sensors S1-S4 of the sensor configuration 160 (e.g., to indicate a position and orientation of the light beam source configuration LC which correspondingly indicates a position and orientation of an end tool ETL). The light beam source configuration LC is configured to be coupled to at least one of an end tool ETL or the end tool mounting configuration ETMC. The position and orientation of the light beam source configuration LC are indicative of a position and orientation of the end tool ETL. The light beams that are directed to the light beam sensors S1-S4 are configured to (e.g., by producing measurement spots SP in positions on the light beam sensors S1-S4) cause the light beam sensors S1-S4 to produce corresponding measurement signals. The processing portion 190 is configured to process the measurement signals from the light beam sensors S1-S4 of the sensor configuration 160, wherein the measurement signals from the light beam sensors S1-S4 indicate the position and orientation of the light beam source configuration LC, which correspondingly indicate the position and orientation of the end tool ETL.

In a second implementation (e.g., as illustrated in FIG. 11), the metrology system 150' includes a sensor configuration 160"", a light beam source configuration LC"" and a processing portion 190. The light beam source configuration LC"" comprises a plurality of light beam source portions LP1-LP4 (e.g., located at fixed positions which at least in part define a metrology frame volume MFV', wherein the metrology frame volume MFV' is configured to be located around at least part of the movement volume MV). The light beam source configuration LC"" is configured to direct light beams to the light beam sensors of the sensor configuration 160"" (e.g., to indicate a position and orientation of the sensor configuration 160"" which correspondingly indicates a position and orientation of an end tool ETL). The sensor configuration 160"" is configured to be coupled to at least one of an end tool ETL or the end tool mounting configuration ETMC. The position and orientation of the sensor configuration 160"" are indicative of a position and orientation of the end tool ETL. The light beams that are directed to the light beam sensors are configured to (e.g., by producing measurement spots SP in positions on the light beam sensors) cause the light beam sensors S1-S4 to produce corresponding measurement signals. The processing portion 190 is configured to process the measurement signals from the light beam sensors of the sensor configuration 160"", wherein the measurement signals from the light beam sensors indicate the position and orientation of the sensor configuration 160"", which correspondingly indicate the position and orientation of the end tool ETL.

Each of the light beam sensors S1-S4 of the sensor configuration 160, 160"" may comprise a two dimensional position sensitive sensor, for which the measurement signals from the light beam sensors S1-S4 indicate the two dimensional positions of the measurement spots SP on the light beam sensors S1-S4 that are produced by the light beams. The light beam source configuration LC, LC"" may comprise one or more diffractive optical elements DOE (e.g., as part of one or more light beam source portions LP) and the light beams B from the light beam source configuration LC, LC"" may be diffracted light beams DLB. The movable configuration MAC may be a moveable arm configuration.

The motion control system 140 may be configured to sense and control a position and orientation of the end tool ETL with a level of accuracy defined as a movement system accuracy, based at least in part on sensing and controlling the position and orientation of the end tool ETL using a plurality of position sensors SEN1-SEN5 included in the movable configuration MAC. The processing portion 190 may be operable to determine a position and orientation of the end tool ETL with an accuracy level that is better than the movement system accuracy, based at least in part on processing the measurement signals from the light beam sensors S1-S4 of the sensor configuration 160, 160"". The light beams B directed by the light beam source configuration LC, LC"" to the sensor configuration 160, 160"" may include a first light beam, and a determination of which light beam sensor the first light beam is directed to may be based at least in part on the sensed position and orientation of the end tool ETL as determined by utilizing the plurality of position sensors SEN1-SEN5 included in the movable configuration MAC. The light beam sensor that the first light beam is directed to may be a first light beam sensor S1, and the processing portion 190 may be operable to determine the position and orientation of the end tool ETL with an accuracy level that is better than the movement system accuracy, based at least in part on processing a first measurement signal from the first light beam sensor S1, for which the first measurement signal indicates a position of a first measurement spot SP as formed by the first light beam B on the first light beam sensor S1.

The light beams B directed by the light beam source configuration LC, LC"" to the sensor configuration 160, 160"" may include a first light beam, and a determination of which light beam sensor the first light beam is directed to may be based at least in part on an identification of a first characteristic of the first light beam. The light beams B directed by the light beam source configuration LC, LC"" may form a pattern (e.g., see FIGS. 9A-10), and the first characteristic of the first light beam that is identified may correspond to an identifiable portion of the pattern that the first light beam is included in.

When the end tool ETL is in a first position and a first orientation (e.g., see FIGS. 8A, 9A and 12A), the light beams B from the light beam source configuration LC, LC"" that are directed to the light beam sensors S1-S4 of the sensor configuration 160, 160"" may be configured to (e.g., by producing measurement spots SP in positions on the light beam sensors S1-S4) cause the light beam sensors S1-S4 to produce a corresponding first set of measurement signals that indicates that the end tool ETL is in the first position and the first orientation. In addition, when the end tool ETL is in a second position and a second orientation that are different than the first position and the first orientation (e.g., see FIGS. 8B-8H, 9B-9C and 12B-12C), the light beams B from the light beam source configuration LC, LC"" that are directed to the light beam sensors S1-S4 of the sensor configuration 160, 160"" may be configured to (e.g., by producing measurement spots SP in positions on the light beam sensors S1-S4) cause the light beam sensors S1-S4 to produce a corresponding second set of measurement signals that is different than the first set of measurement signals and that indicates that the end tool ETL is in the second position and the second orientation.

When the end tool ETL is in the first position and the first orientation, the positions of the measurement spots SP on the light beam sensors S1-S4 may correspond to a first set of measurement spot positions (e.g., see view 840A of FIG. 8A, view 940A of FIG. 9A and view 1240A of FIG. 12A), and when the end tool ETL is in the second position and the second orientation, the positions of the measurement spots SP on the light beam sensors S1-S4 may correspond to a second set of measurement spot positions that is different than the first set of measurement spot positions (e.g., see views 840B-840H of FIGS. 8B-8H, views 940B-940C of FIGS. 9B-9C and views 1240B-1240C of FIGS. 12B-12C).

When the end tool ETL is in the first position and the first orientation, the light beams B from the light beam source configuration LC, LC"" that are directed to the light beam sensors S1-S4 may correspond to a first set of light beams B (e.g., see FIG. 9A), and when the end tool ETL is in the second position and the second orientation, the light beams B from the light beam source configuration LC, LC"" that are directed to the light beam sensors S1-S4 may correspond to a second set of light beams B that is different than the first set of light beams B (e.g., see FIG. 9B, wherein the light beams B2C, B3C, B4D and B4E are no longer part of a set of light beams that are directed to the light beam sensors).

When the end tool ETL is in the first position and the first orientation, the light beams B from the light beam source configuration LC, LC"" that are directed to the light beam sensors S1-S4 of the sensor configuration 160, 160"" may comprise a first plurality of light beams B that are directed to a first light beam sensor of the sensor configuration 160, 160"" and which form a corresponding first plurality of measurement spots SP at corresponding positions on the first light beam sensor (e.g., see FIG. 9A, with light beams B2A-B2C directed to light beam sensor S2 and producing measurement spots SP2A-SP2C). When the end tool ETL is in the second position and the second orientation, the light beams B from the light beam source configuration LC, LC"" that are directed to the light beam sensors S1-S4 of the sensor configuration 160, 160"" may comprise a second plurality of light beams B that are directed to the first light beam sensor of the sensor configuration 160, 160"", for which the second plurality of light beams B is different than the first plurality of light beams B (e.g., see FIG. 9C, with light beams B4A-B4E directed to light beam sensor S2 and producing measurement spots SP4A-SP4E).

In various implementations, the sensor configuration 160, 160"" may comprise a first light beam sensor that is configured to: produce a first measurement signal when the end tool ETL is in a first position and in a first orientation, for which the first measurement signal is produced by the first light beam sensor based at least in part on the light beam source configuration LC, LC"" directing a first light beam to form a measurement spot at a corresponding first position on the first light beam sensor (e.g., see FIGS. 8A and 12A, with measurement spot SP1 as produced on sensor S1 by light beam B1); and produce a second measurement signal that is different than the first measurement signal when the end tool ETL is in at least one of a second position that is different than the first position or a second orientation that is different than the first orientation, for which the second measurement signal is produced by the first light beam sensor based at least in part on the light beam source configuration LC, LC"" directing the first light beam to form a measurement spot at a corresponding second position that is different than the first position on the first light beam sensor (e.g., see FIG. 8B, 8C, 8D, 8G, 8H, 12B, or 12C, in each case with measurement spot SP1 as produced on sensor S1 by light beam B1).

The processing portion 190 may be configured to: determine that the end tool ETL is in the first position and first orientation based at least in part on processing the first measurement signal from the first light beam sensor in combination with other measurement signals from the light beam sensors S1-S4 of the sensor configuration 160, 160"" (e.g., see FIGS. 8A and 12A); and determine that the end tool ETL is in the at least one of second position or second orientation based at least in part on processing the second measurement signal from the first light beam sensor in combination with other measurement signals from the light beam sensors S1-S4 of the sensor configuration 160 (e.g., see FIG. 8B, 8C, 8D, 8G, 8H, 12B, or 12C).

A metrology frame volume MFV, MFV' may be defined at least in part by the sensor configuration 160 or the light beam source configuration LC"" (e.g., for which positions of sensors S1-S4 of the sensor configuration 160, or positions of light beam source portions LP1-LP4 of the light beam source configuration LC"", may determine or otherwise correspond to positions of boundaries of the metrology frame volume MFV, MFV'). The metrology frame volume MFV, MFV' may be configured to surround at least part of the movement volume MV.

According to a further aspect, a method is provided that includes generally two steps. The first step 1110 includes operating a light beam source configuration LC, LC"" to direct light beams B to light beam sensors S1-S4 of a sensor configuration 160, 160"" to indicate a position and orientation of an end tool ETL. The second step 1120 includes processing the measurement signals from the light beam sensors S1-S4 of the sensor configuration 160, 160"" to determine the position and orientation of the end tool ETL.

Position information may be received from the movement system that moves the end tool ETL, wherein the position information indicates a position of the end tool ETL with a movement system accuracy, for which the determination of the position and orientation of the end tool ETL is based at least in part on the position information from the movement system and the processing of the measurement signals from the light beam sensors S1-S4 of the sensor configuration 160, 160"".

The light beams B directed by the light beam source configuration LC, LC"" to the sensor configuration 160, 160"" may form a pattern and include a first light beam in a first portion of the pattern, and a determination of which light beam sensor the first light beam is directed to may be based at least in part on an identification of the first portion of the pattern that the first light beam is included in (e.g., see FIGS. 9A-10).

According to a further aspect, a metrology system 150, 150' is provided including a sensor configuration 160, 160"" comprising a plurality of light beam sensors (e.g., light beam sensors S1-S4). A light beam source configuration LC, LC"" is configured to direct light beams B to the light beam sensors S1-S4 of the sensor configuration 160, 160"". One of the light beam source configuration LC or the sensor configuration 160"" is configured to be coupled to at least one of the end tool ETL or an end tool mounting configuration ETMC of a movement system 110 that moves the end tool ETL. A processing portion 190 is configured to process the measurement signals from the light beam sensors S1-S4 of the sensor configuration 160, 160"", wherein the measurement signals from the light beam sensors S1-S4 indicate the position and orientation of the end tool ETL.

While preferred implementations of the present disclosure have been illustrated and described, numerous variations in the illustrated and described arrangements of features and sequences of operations will be apparent to one skilled in the art based on this disclosure. Various alternative forms may be used to implement the principles disclosed herein. In addition, the various implementations described above can be combined to provide further implementations. All of the U.S. patents and U.S. patent applications referred to in this specification are incorporated herein by reference, in their entirety. Aspects of the implementations can be modified, if necessary to employ concepts of the various patents and applications to provide yet further implementations.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled.

The invention claimed is:

1. A metrology system for use with a movement system that moves an end tool,
  the movement system comprising:
    a movable configuration comprising an end tool mounting configuration that an end tool is configured to mount to; and
    a motion control system configured to control an end tool position and orientation, based at least in part on controlling the movable configuration so as to move at least a portion of an end tool that is mounted to the end tool mounting configuration within a movement volume,
  the metrology system comprising:
    a sensor configuration comprising a plurality of light beam sensors;
    a light beam source configuration that is configured to direct light beams to the light beam sensors of the sensor configuration, wherein:
      one of the light beam source configuration or the sensor configuration is configured to be coupled to at least one of the end tool or the end tool mounting configuration; and
      the light beams that are directed to the light beam sensors are configured to cause the light beam sensors to produce corresponding measurement signals; and
    a processing portion configured to process the measurement signals from the light beam sensors of the sensor configuration, wherein the measurement signals from the light beam sensors indicate a position and orientation of the end tool.

2. The system of claim 1, wherein each of the light beam sensors comprises a two dimensional position sensitive sensor, for which the measurement signals from the light beam sensors indicate the two dimensional positions of measurement spots on the light beam sensors that are produced by the light beams.

3. The system of claim 1, wherein the light beam source configuration comprises one or more diffractive optical elements and the light beams from the light beam source configuration are diffracted light beams.

4. The system of claim 1, wherein the movable configuration is a moveable arm configuration.

5. The system of claim 1, wherein the motion control system is configured to sense and control a position and orientation of the end tool with a level of accuracy defined as a movement system accuracy, based at least in part on sensing and controlling the position and orientation of the end tool using a plurality of position sensors included in the movable configuration.

6. The system of claim 5, wherein the processing portion is operable to determine a position and orientation of the end tool with an accuracy level that is better than the movement system accuracy, based at least in part on processing the measurement signals from the light beam sensors.

7. The system of claim 5, wherein the light beams directed by the light beam source configuration to the sensor configuration include a first light beam, and a determination of which light beam sensor the first light beam is directed to is based at least in part on a sensed position and orientation of the end tool as determined by utilizing the plurality of position sensors included in the movable configuration.

8. The system of claim 7, wherein the light beam sensor that the first light beam is directed to is a first light beam sensor, and the processing portion is operable to determine the position and orientation of the end tool with an accuracy level that is better than the movement system accuracy, based at least in part on processing a first measurement signal from the first light beam sensor, for which the first measurement signal indicates a position of a first measurement spot as formed by the first light beam on the first light beam sensor.

9. The system of claim 1, wherein the light beams directed by the light beam source configuration to the sensor configuration include a first light beam, and a determination of which light beam sensor the first light beam is directed to is based at least in part on an identification of a first characteristic of the first light beam.

10. The system of claim 9, wherein the light beams directed by the light beam source configuration form a pattern, and the first characteristic of the first light beam that is identified corresponds to an identifiable portion of the pattern that the first light beam is included in.

11. The system of claim 1, wherein:
when the end tool is in a first position and a first orientation, the light beams from the light beam source configuration that are directed to the light beam sensors of the sensor configuration are configured to cause the light beam sensors to produce a corresponding first set of measurement signals that indicates that the end tool is in the first position and the first orientation; and
when the end tool is in a second position and a second orientation that are different than the first position and the first orientation, the light beams from the light beam source configuration that are directed to the light beam sensors of the sensor configuration are configured to cause the light beam sensors to produce a corresponding second set of measurement signals that is different than the first set of measurement signals and that indicates that the end tool is in the second position and the second orientation.

12. The system of claim 11, wherein the light beams from the light beam source configuration that are directed to the light beam sensors of the sensor configuration are configured to produce measurement spots in positions on the light beam sensors that cause the light beam sensors to produce the corresponding measurement signals, and when the end tool is in the first position and the first orientation, the positions of the measurement spots on the light beam sensors correspond to a first set of measurement spot positions, and when the end tool is in the second position and the second orientation, the positions of the measurement spots on the light beam sensors correspond to a second set of measurement spot positions that is different than the first set of measurement spot positions.

13. The system of claim 11, wherein when the end tool is in the first position and the first orientation, the light beams from the light beam source configuration that are directed to the light beam sensors correspond to a first set of light beams, and when the end tool is in the second position and the second orientation, the light beams from the light beam source configuration that are directed to the light beam sensors correspond to a second set of light beams that is different than the first set of light beams.

14. The system of claim 11, wherein:
when the end tool is in the first position and the first orientation, the light beams from the light beam source configuration that are directed to the light beam sensors of the sensor configuration comprise a first plurality of light beams that are directed to a first light beam sensor of the sensor configuration; and
when the end tool is in the second position and the second orientation, the light beams from the light beam source configuration that are directed to the light beam sensors of the sensor configuration comprise a second plurality of light beams that are directed to the first light beam sensor of the sensor configuration, for which the second plurality of light beams is different than the first plurality of light beams.

15. The system of claim 1, wherein the sensor configuration comprises a first light beam sensor that is configured to:
produce a first measurement signal when the end tool is in a first position and in a first orientation, for which the first measurement signal is produced by the first light beam sensor based at least in part on the light beam source configuration directing a first light beam to form a measurement spot at a corresponding first position on the first light beam sensor; and
produce a second measurement signal that is different than the first measurement signal when the end tool is in at least one of a second position that is different than the first position or a second orientation that is different than the first orientation, for which the second measurement signal is produced by the first light beam sensor based at least in part on the light beam source configuration directing the first light beam to form a measurement spot at a corresponding second position that is different than the first position on the first light beam sensor.

16. The system of claim 15, wherein the processing portion is configured to:

determine that the end tool is in the first position and first orientation based at least in part on processing the first measurement signal from the first light beam sensor in combination with other measurement signals from the light beam sensors of the sensor configuration; and determine that the end tool is in the at least one of second position or second orientation based at least in part on processing the second measurement signal from the first light beam sensor in combination with other measurement signals from the light beam sensors of the sensor configuration.

17. The system of claim 1, wherein a metrology frame volume is defined at least in part by the sensor configuration or the light beam source configuration, for which the metrology frame volume is configured to surround at least part of the movement volume.

18. The system of claim 1, wherein:
the light beam source configuration is coupled to at least one of the end tool or the end tool mounting configuration;
the position and orientation of the light beam source configuration are indicative of the position and orientation of the end tool; and
the measurement signals from the light beam sensors indicate the position and orientation of the light beam source configuration.

19. The system of claim 1, wherein:
the sensor configuration is coupled to at least one of the end tool or the end tool mounting configuration;
the position and orientation of the sensor configuration are indicative of the position and orientation of the end tool; and
the measurement signals from the light beam sensors indicate the position and orientation of the sensor configuration.

20. A method of operating a metrology system that comprises: a sensor configuration comprising a plurality of light beam sensors; and a light beam source configuration that is configured to direct light beams to the light beam sensors of the sensor configuration, wherein one of the light beam source configuration or the sensor configuration is configured to be coupled to at least one of an end tool or an end tool mounting configuration of a movement system that moves the end tool, the method comprising:

operating the light beam source configuration to direct light beams to light beam sensors of the sensor configuration to indicate a position and orientation of the end tool, wherein:
the light beams that are directed to the light beam sensors cause the light beam sensors to produce corresponding measurement signals; and
processing the measurement signals from the light beam sensors of the sensor configuration to determine the position and orientation of the end tool.

21. The method of claim 20, further comprising receiving position information from the movement system that moves the end tool, wherein the position information indicates a position of the end tool with a movement system accuracy, for which the determination of the position and orientation of the end tool is based at least in part on the position information from the movement system and the processing of the measurement signals from the light beam sensors of the sensor configuration.

22. The method of claim 20, wherein the light beams directed by the light beam source configuration to the sensor configuration form a pattern and include a first light beam in a first portion of the pattern, and a determination of which light beam sensor the first light beam is directed to is based at least in part on an identification of the first portion of the pattern that the first light beam is included in.

23. A metrology system, comprising:
a sensor configuration comprising a plurality of light beam sensors;
a light beam source configuration that is configured to direct light beams to the light beam sensors of the sensor configuration, wherein:
one of the light beam source configuration or the sensor configuration is configured to be coupled to at least one of an end tool or an end tool mounting configuration of a movement system that moves the end tool;
the light beams that are directed to the light beam sensors are configured to cause the light beam sensors to produce corresponding measurement signals; and
a processing portion configured to process the measurement signals from the light beam sensors of the sensor configuration, wherein the measurement signals from the light beam sensors indicate a position and orientation of the end tool.

* * * * *